United States Patent
Watson

(10) Patent No.: US 7,617,727 B2
(45) Date of Patent: *Nov. 17, 2009

(54) VIBRATING INERTIAL RATE SENSOR UTILIZING SPLIT OR SKEWED OPERATIONAL ELEMENTS

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 100 days.

This patent is subject to a terminal disclaimer.

(21) Appl. No.: 11/693,214

(22) Filed: Mar. 29, 2007

(65) Prior Publication Data

US 2007/0256495 A1    Nov. 8, 2007

Related U.S. Application Data

(63) Continuation-in-part of application No. 11/640,823, filed on Dec. 18, 2006, now Pat. No. 7,526,957, which is a continuation-in-part of application No. 11/379,169, filed on Apr. 18, 2006, now abandoned.

(60) Provisional application No. 60/826,046, filed on Sep. 18, 2006.

(51) Int. Cl.
*G01P 9/04* (2006.01)
*G01C 19/00* (2006.01)

(52) U.S. Cl. .................. 73/504.13; 73/504.16

(58) Field of Classification Search ............. 73/504.04, 73/504.12, 504.13, 504.15, 504.16
See application file for complete search history.

(56) References Cited

U.S. PATENT DOCUMENTS

| 4,157,041 | A | 6/1979 | Loper, Jr. et al. |
| 4,655,081 | A | 4/1987 | Burdess |
| 4,759,220 | A | 7/1988 | Burdess et al. |
| 4,951,508 | A | 8/1990 | Loper, Jr. et al. |
| 5,218,867 | A | 6/1993 | Varnham et al. |
| 5,349,857 | A | 9/1994 | Kasanami et al. |
| 5,430,342 | A | 7/1995 | Watson |
| 5,445,007 | A | 8/1995 | Varnham et al. |

(Continued)

OTHER PUBLICATIONS

Watson, William S., *Vibrating Element Angular Rate Sensors for Precision Applications*, pp. 17-20, date unknown.

(Continued)

*Primary Examiner*—Helen C. Kwok
(74) *Attorney, Agent, or Firm*—Patterson, Thuente, Skaar & Christensen, P.A.

(57) ABSTRACT

A vibrating inertial rate sensor has operational elements that define axes that are rotationally offset or "skewed" from a node or anti-node reference axis. The skew may be relative to separate node or anti-node reference axes, or take the form of an element that is "split" about the same node axis. Both the drive signal and the sense signal may be resolved from a common set of sensing elements. The drive elements may also operate on a skewed axis angle to rotationally offset the vibration pattern to affect active torquing of the gyroscope. Skewed drive elements may be combined with skewed or split elements on the same device. The skewed sensing scheme may be applied to vibratory systems having one or more node axes. The skewed drive scheme may be applied to vibratory systems having two or more node axes to affect active torquing.

62 Claims, 20 Drawing Sheets

U.S. PATENT DOCUMENTS

| | | | |
|---|---|---|---|
| 5,471,875 | A | 12/1995 | Sato et al. |
| 5,540,094 | A | 7/1996 | Varnham et al. |
| 5,587,529 | A | 12/1996 | Iguchi et al. |
| 5,621,171 | A | 4/1997 | Fell |
| 5,635,640 | A | 6/1997 | Geen |
| 5,763,780 | A | 6/1998 | Matthews et al. |
| 5,817,940 | A | 10/1998 | Kobayashi et al. |
| 5,932,802 | A | 8/1999 | Ogawa |
| 6,272,925 | B1 | 8/2001 | Watson |
| 6,550,329 | B1 | 4/2003 | Watson |
| 6,651,499 | B2 | 11/2003 | Fell et al. |
| 6,698,271 | B1 | 3/2004 | Fell et al. |
| 6,805,007 | B2 | 10/2004 | Fell et al. |
| 6,845,667 | B1 | 1/2005 | Watson |
| 6,848,305 | B2 | 2/2005 | Fell et al. |
| 6,883,374 | B2 | 4/2005 | Fell et al. |
| 7,188,523 | B2 | 3/2007 | Wyse et al. |
| 7,526,957 | B2 * | 5/2009 | Watson .................... 73/504.13 |
| 2007/0240508 | A1 | 10/2007 | Watson |

OTHER PUBLICATIONS

Fell, C., Hopkin, I., and Townsend, K., *A Second Generation Silicon Ring Gyroscope*, Symposium Gyro Technology, pp. 1.0-1.14, Dated 1999.

Lynch, D. D., *Coriolis Vibratory Gyros*, Symposium Gyro Technology, pp. 1.0-1.14, Dated 1998.

Watson, William S., *Vibrating Structure Gyro Performance Improvements*, Symposium Gyro Technology, pp. 6.0 to 6.13, Dated 2000.

Watson, William S., *Improved Vibratory Gyro Pick-Off and Drive Geometry*, Symposium Gyro Technology, pp. 5.0 to 5.14, Dated 2006.

International Search Report, dated Feb. 27, 2008, pp. 1-10.

* cited by examiner

VIBRATING INERTIAL RATE SENSOR UTILIZING SPLIT OR SKEWED OPERATIONAL ELEMENTS

RELATED APPLICATIONS

This application is a continuation-in-part of and claims priority to U.S. patent application Ser. No. 11/640,823, filed 18 Dec. 2006, which is a continuation in part of U.S. patent application Ser. No. 11/379,169, filed 18 Apr. 2006, now abandoned, both of which are hereby incorporated by reference herein in their entirety. This application further claims benefit of the filing date of U.S. Provisional Patent Application No. 60/826,046, filed 18 Sep. 2006, which is hereby incorporated by reference herein in its entirety.

TECHNICAL FIELD

The present disclosure relates generally to angular rate sensors, and more particularly to vibrating element angular rate sensors used, for example, as gyroscopes.

BACKGROUND OF THE DISCLOSURE

Instrumentation sensors that operate on a principle of vibration of constrained actuator masses are known in the art. Angular rate gyroscopes make use of the principle of inertia to measure the rate of rotation through an angle with respect to a sensing axis. One type of angular rate gyroscope is the solid-state gyroscope. Vibrating rate gyroscopes utilize standing waves that are excited in a resonating element to produce a desired mode of oscillation having a predetermined number of nodes at predetermined node spaces. The oscillations have an inherent oscillatory inertia that is insensitive to the translation motion of the gyroscope itself, as well as to rotational movement that is orthogonal to a sensing axis. To the extent the resonating element is rotated about the sensing axis, the oscillations will essentially maintain their nature or character (i.e. the predetermined number of nodes and node spacing). The rotation of the nodes that define the desired mode of oscillation may lag the actual rotation of the physical structure of the resonating element about the sensing axis. The lag is characterized by a "precession constant" that is the ratio of the rotation of the oscillation pattern to the rotation of the resonating element. Accordingly, it is possible to determine the rate of rotation of the resonating element, in addition to the magnitude and direction of rotation by measuring the rotational displacement of the nodes on the resonating element.

Solid-state gyroscopes based on the principle described above are capable of sensing only rotation and then usually only about a single axis. To obtain information sufficient to determine the relative attitude of a body, it is necessary to group three such gyroscopes in an orthogonal relationship covering the x, y, and z Cartesian axes. The inherent challenge in using vibrating rate sensors, particularly multiple vibrating rate sensors, is trying to reduce or cancel out any differences or noise at the nodes so that the accuracy and reliability of the solid-state gyroscope can be optimized.

The conventional wisdom is that to minimize the inherent challenges presented by vibrating rate sensors a gyroscope should have maximum geometrical symmetry among the rate sensors, be made of materials having a high mechanical "Q" (defined as ratio of the magnitude of the total energy of a vibrating system to the magnitude of the energy added to the system to maintain that total energy magnitude during each oscillatory cycle), and feature isolation of the drive and rate sensing functions. See, e.g., W. S. Watson, *Vibrating Element Angular Rate Sensor For Precision Applications*, IEEE Position Location and Navigation Symposium, 1990; D. D. Lynch, *Coriolis Vibratory Gyros*, Symposium Gyro Technology, Stuttgart Germany, September 1998; and C. Fell, I. Hopkin, K. Townsend, *A Second Generation Silicon Ring Gyroscope*, Symposium Gyro Technology, Stuttgart Germany, September 1999. Unfortunately, these aspirations must be regularly compromised in the real world in order to reduce cost and complexity of the gyros.

For example, one type of angular rate sensor utilizes a cup or bell shaped sensor that is supported upon a stem and secured to the chassis of the sensor. The surface of the cup includes drive electrodes and sense electrodes that are alternately oriented symmetrically around the perimeter surface. Exciting the drive electrodes induces a controlled oscillation upon the cup. The sense electrodes produce a signal that is demodulated in control circuitry to determine the angular rate at which the sensor is rotated. A number of techniques are known in the art that attempt to correct for errors in the desired mode of oscillation due to inherent errors and imperfections in the gyroscope assembly.

U.S. Pat. No. 5,471,875 to Sato et al. teaches the use of a first pair and a second pair of radially opposed driving electrodes provided on the outer surface of a resonator located at a pre-determined anti-node axes of a cylindrical shaped resonator, and means for generating concurrently a first force and a second force at each of the first driving electrodes and each of the second driving electrodes, respectively, so that the first force reverses its direction along the radius of the resonator at a regular interval, the second force reverses its direction along the radius of the resonator at a regular interval, and the direction of the first force is opposite the direction of the second force. The complimentary action of the first and second forces prevents or limits offset of the nodes thereby restricting the null voltage signal at the sensors, which are located at the oscillation nodes. Accordingly, the drive and the sense electrodes are distributed at equal angular spacing about the centerline of the cylindrical resonator and are coincident with the antinodal and nodal axes, respectively.

U.S. Pat. Nos. 5,218,867 to Varnham et al. and 6,805,007 to Fell, et al. disclose what is herein referred to as a "mixed pair" of elements, i.e. drive elements diametrically opposed to sense elements about axisymmetric vibratory elements. At least two such mixed pairs are utilized, with a rotational displacement of 45° therebetween. The 45° displacement coincides with the spacing between adjacent nodal and antinodal axes of the disclosed oscillatory patterns. The angular arrangement about the centerline enables the drive elements to control the oscillation pattern and optimizes sensing of the position of the oscillation pattern in response to a rotational rate.

U.S. Pat. No. 5,445,007 to Varnham et al. discloses a correction technique for a cup resonator that entails splitting the connections for one of the drive electrodes and driving the split electrode with a pair of drive voltages that are then typically detected by a corresponding pair of drive sensors for purposes of making adjustments to attempt to correct any errors in the desired mode of oscillation. This technique suffers from a number of shortcomings. In order to maintain symmetry of the oscillation, the mass and size of all of the elements are matched as closely as possible, but the asymmetry introduced by splitting one drive electrode adversely affects the overall uniformity and ability to maintain the desired oscillation mode. Additionally, the split drive electrode requires two conductor connections instead of the single conductor utilized on the other elements. The additional mass of the second connection introduces further asymmetry that is deleterious to resonance performance. In addition, the split drive plate is used only for static alignment, and is not used to augment active torque adjustment.

Compensation techniques exist to counter these shortcomings, such as corrective signals from other sensors such as thermistors, the use of EEPROM correction tables, or restricting use to a reduced temperature range. However, these measures tend to add complexity and cost to the design and require extra testing and adjustment. Even if cost and complexity were not issues, these measures are of limited effectiveness as they attempt to correct the problem after the fact, rather than addressing the underlying challenge.

The use of split electrodes for signal sensing is disclosed for geometries other than the cup geometry. U.S. Pat. No. 5,932,802 to Ogawa discloses a rectangular bar gyroscope wherein a variable amount of phase adjusted drive signal is injected into the sense signals. A number of patents, such as U.S. Pat. No. 5,760,303 to Murai, et al. disclose a similar arrangement for a triangular bar gyroscope. U.S. Pat. No. 5,430,342 to Watson discloses a similar concept in a flat plate geometry.

A detrimental characteristic of these devices is that the automatic gain control (AGC) is disturbed whenever there is a rotation rate present. The disturbance causes additional noise on the resolved signals. Moreover, alignment errors between the drive axis and the rate sense axis will overlay the rate sense signal with some amount of drive signal that will create a false indication of rotation.

Another known type of angular rate sensor comprises the use of piezoelectric ceramic bender elements in a paired tuning fork arrangement. In this type of arrangement, a pair of drive elements is energized to induce a controlled vibration within a single plane. The application of rotational forces upon the vibrating elements parallel to the plane of vibration and on the axis of symmetry induces a measurable signal characteristic of the angular relationship between the sensing object and the vibrating elements. Inherent to tuning fork designs are the bending forces that result from the oscillating drive elements. Although some designs attempt to reduce such undesirable forces by isolating the drive and sense elements, there are still errors that lead to reduced signal-to-noise ratios and false indication of rotation.

While numerous vibration based angular rate sense systems exist, none provide a simple and economical design with the ability to both adjust the angular relationship between the drive and sense elements and maintain symmetrical mass structures for maintaining desired oscillatory modes. Existing designs also do not accommodate the use of combined functions (i.e. drive and torque or drive sense and rotational sense) in the control and operation of vibration based angular rate sense system.

SUMMARY OF THE DISCLOSURE

In accordance with various embodiments of the present invention, a vibrating inertial rate sensor that has either drive or sense elements that are rotationally offset or "skewed" from their typical orthogonal or rotationally symmetric relationship. In one embodiment, a plurality of reference axes are defined by the nodes and anti-nodes of an oscillatory pattern on a continuous or axisymmetric vibrating structure. The members of a first pair of drive or sense elements reside on opposite sides of the structure and are offset or "skewed" in one rotational direction relative to a first reference axis. A second pair of drive or sense elements is skewed in the opposing rotational direction relative to a second reference axis.

The magnitude of the respective offsets may or may not be equal. When the skewed element pairs are sense elements, the gain ratio of the signals from the two pairs may be adjusted to determine the effective sensing vector without the need for additional conductor connections. Also, the sense elements detect a vibration that includes both a component of the drive vector and a component of the rotational rate vector. These components can be resolved by adding and subtracting the signals from the respective skewed sense element pairs.

When the skewed element pairs are drive elements, the gain ratio of the excitation voltages may be adjusted to redirect or "torque" the oscillatory node position, again without resort to additional conductor connections. Certain principles of the present invention may be applicable to a variety of vibrating structure gyroscope or vibrating inertial rate sensor forms, including, but not limited to, cup-type or bell-type vibrating structures, ring-type vibrating structures, fork-type vibrating structures and plate-type vibrating structures.

Embodiments of the invention may include a vibratory resonator with a continuous body that forms a closed loop on a plane that is orthogonal to a centerline axis, a plurality of operational element pairs operatively coupled to the continuous body centered about the centerline axis to define a plurality of operational element axes. The plurality of operational element pairs may be arranged in a non-uniform distribution about the centerline axis, but this non-uniform distribution is characterized by a mirrored symmetry about a plane inclusive of the centerline axis.

Some embodiment affect the offset of the operational elements by utilizing a pattern having a length that defines an axis, the pattern being divisible into a first half and a second half. At least a first and a second pair of operational elements are included in the pattern, the operational elements selected from the group consisting of drive elements and sense elements Each operational element is further characterized by a centroid, with the centroids of the first pair of operational elements being located on the first half of the pattern length and presenting a first span length between the centroids that is parallel to the pattern axis The centroids of the first pair further define a first midpoint located equidistant therebetween. The centroids of the second pair of operational elements are located on the second half of the pattern length and present a second span length parallel to the pattern axis, the centroids of the second pair defining a second midpoint located equidistant therebetween. The first and second midpoints are separated by a distance substantially equal to one-half of the pattern length, and the first span length is substantially equal to the second span length and substantially unequal to one quarter of the pattern length.

In other embodiments, the vibratory resonator includes a continuous body having a centerline axis and a means for generating an oscillation pattern on the vibratory resonator. The oscillation pattern defines a plurality of node pairs and anti-node pairs, each being centered about the centerline axis and defining a plurality of reference axes that pass through a corresponding node or anti-node pair. A plurality of operational elements pairs are operatively coupled with the continuous body and define a plurality of operational element axes with each of the plurality of operational element axes passing through a corresponding one of the plurality of operational elements and intersecting the centerline axis. A given operational element axis may also pass through two operational elements that are centered about the centerline axis. One of the operational element axes is characterized by a first rotational offset relative to its corresponding reference axis and is not coincident with any of the other reference axes. A second operational element axis is characterized by a second rotational offset from its corresponding reference axis in a direction opposite the first rotational offset.

Certain configurations of the invention may be directed to the detection of both the drive and the rotational rate vectors without need for dedicated sensing elements for either component. In these embodiments, a vibratory resonator continuous about a centerline axis and a means for generating an oscillation pattern defines a plurality of nodes thereon. A pair of sensing elements may be operatively coupled with the vibratory resonator, the sensing elements being centered about and immediately adjacent to one of the plurality of nodes when the vibratory resonator is rotationally stationary. In other embodiments, at least one drive element is operatively coupled with a vibratory resonator to create a vibration on at least a portion thereof. A first sensing element is operatively coupled with the resonator to sense a first vector of the vibration that includes a first drive component. A second sensing element is operatively coupled with the resonator to sense a second vector of the vibration, the second vector including a second drive component that has an opposite oscillation phase relative to the first drive oscillation component.

Other embodiments may be directed to providing dynamic torquing of a vibrating or oscillatory pattern on a vibratory resonator without need for elements dedicated to the torquing function. Such assemblies generally include a continuous vibratory resonator; and a mechanism for generating and dynamically rotationally displacing an oscillation pattern on the continuous vibratory resonator. The oscillation pattern may be characterized by at least one anti-node having an oscillation amplitude on the vibratory resonator. Mechanisms and systems for determining a rotation rate and oscillation amplitude of the anti-node is also disclosed.

Still other embodiments may combine the dynamic torquing capability with the simultaneous drive and rotational rate determination by offsetting both drive element pairs and sense element pairs from their respective reference axes.

Other embodiments disclose methods for using or making the disclosed gyroscopes. One method of using certain embodiments of the disclosed invention includes selection of a gyroscope having a first sensing element configured to sense a first vibration vector having a first drive oscillation component and a first rotational rate component and a second sensing element configured to sense a second vibration vector having a second drive oscillation component and a second rotational rate component, with the second drive oscillation being of opposite oscillation phase relative to the first drive oscillation component. A first signal is obtained from the first sensing element and a second signal from the second sensing element. The first and second signals are utilized to determine the magnitude of the drive oscillation by performing at least one operation selected from the group consisting of a subtraction of the first and second signals and an addition of the first and second signals. A rotation rate of the vibrating gyroscope may also be determined by performing an operation selected from the group consisting of an addition of the first and second signals and a subtraction of the first and second signals.

A method of making an inertial rate sensor is disclosed in another embodiment of the invention that includes selecting an arrangement having an overall length divisible into a first half and a second half and including at least two pairs of like-functioning operational element patterns, one pair having a midpoint located on the first half of the pattern, another pair having a midpoint centered on the second half of the arrangement. The midpoints may present a distance therebetween that is substantially equal to half of the overall length of the arrangement, each like-functioning operational element pattern having a centroid, the centroids of each like-functioning operational element pattern pair being located a same distance apart, the same distance being substantially unequal to one-quarter of the overall length of the pattern. The like-functioning operational element patterns are transferred to a continuous resonator and converted to like-functioning operational elements.

In another embodiment of the invention, one of the elements of a given sense element pair is split about the reference axis of a continuous (e.g. cup-type, bell-type, ring-type) resonator. Operatively, the split element is two distinct sensing elements that are effectively rotationally offset in opposite directions about the same reference axis. As with the skewed sense element configuration, the split sense element signals can be utilized to resolve both the drive vector and rotational rate vector. In a similar or related embodiment, both the elements of a given sense element pair are split about a reference axis. This "dual split" configuration creates essentially a skewed element configuration wherein the elements are skewed about the same axis, providing the same functionality as the single split sense element configuration but with improved signal-to-noise characteristics and a more symmetrical resonator configuration.

In yet another embodiment, an inertial sensor apparatus for use in producing an angular rotation signal indicative of a rate of angular rotation of the inertial sensor apparatus comprises a vibratory resonator structure, such as a cup, plate, or ring, having a first node reference axis associated with a desired mode of oscillation. A first sense element pair in the form of a pair of electrodes is located substantially on the vibratory resonator structure, the sense elements being in diametric opposition to one another to define a first sense axis that is rotationally offset or "skewed" from the first node reference axis. The first pair of sense electrodes are configured and arranged to generate a first signal in response to rotation of the inertial sensor apparatus. In the application of this embodiment to a gyroscope, the vibratory resonator structure is configured and arranged to vibrate in response to an excitation voltage.

Advantages of certain skewed and split sense embodiments may include improved rate sense and drive sense signals over existing vibratory gyroscope designs, produced by fewer electrode connections for simplicity and greater symmetry for better resonance performance. Also, the gains of both signals may track and the open loop gain may be constant within the limits of the AGC system because the same electrodes are used for sensing both the rotation rate and the drive amplitude. In addition, the availability of additional sense electrodes may provide for a larger signal-to-noise ratio.

In another embodiment, a drive element in the form of a pair of drive electrodes may be located substantially opposite one another and rotationally offset from the sense electrodes of the vibratory resonator structure. The drive electrodes serve to control excitation and the subsequent oscillation vector of the vibratory resonator structure. An advantage of the skewed drive electrode configuration is the facilitation of active torquing adjustments through the drive elements without resort to utilizing dedicated elements. The skewed arrangement of the drive elements enables adjustment of the driven oscillation vector without resort to separate, dedicated torque elements. The ratio of the drive voltages for each drive axis is adjusted to affect the position of the drive vector between the two skew angles, thus effecting either static alignment or torquing the drive vector.

In the skewed drive embodiment, the resonator structure may also define a second node reference axis associated with the desired mode of oscillation, which is substantially orthogonal to the first node reference axis. Because there is no need for a dedicated pair of electrodes to perform the torquing function in this embodiment, a second sense element in the form of a second pair of sense electrodes may be positioned in their stead. The sense electrodes of the second pair are located substantially opposite one another to define a second sense axis that is also rotationally offset or skewed from the second node reference axis. The skew allows a small controlled amount of drive motion to be collected on the electrode along with the rate sense signal. This second pair of sense electrodes generates a second signal of opposite polarity in response to rotation of the inertial sensor apparatus and of the same polarity in response to drive motion. By subtracting the signals from the first and second sense electrodes, one can determine an angular rate sense signal. Addition of the first and second sense electrode signals provides indicia of the drive sense signal.

Another embodiment of the invention includes a method of electrically interfacing with an inertial sensor that includes a vibratory resonator having an axis of symmetry and a plurality of operational elements situated about the axis of symmetry. The method involves applying a first oscillation drive signal to a first set of at least one operational element and applying a second oscillation drive signal to a second set of at least one operational element that is different from the first set such that at least one of the first and second oscillation drive signals causes the vibratory resonator to vibrate in a vibration pattern about the axis of symmetry, the vibration pattern including a plurality of nodes situated in a first position in relation to the vibratory resonator. The vibration pattern is changed such that the plurality of nodes are situated in a second position in relation to the vibratory resonator that is different from the first position by varying an amplitude of at least one of the first oscillation drive signal and the second oscillation drive signal.

In another embodiment of the invention, a circuit electrically interfaces with an inertial sensor that includes a vibratory resonator. The circuit includes an excitation signal generator that applies a set of at least one excitation signal to the vibratory resonator that causes the vibratory resonator to vibrate in a vibration pattern. A vibration pattern monitor obtains a first signal and a second signal, each signal being indicative of a vibration characteristic of the vibration pattern present at a corresponding first and second location, respectively, on the vibratory resonator, the first location being different from the second location. Each of the first and the second signals include a first amplitude component associated with a rate of the angular motion of the inertial sensor, and a second amplitude component associated with the set of at least one excitation signal. The vibration pattern monitor obtains at least one of the first and the second amplitude components from the first and the second signals.

Another embodiment of the invention includes a method of electrically interfacing with an inertial sensor that includes a vibratory resonator by applying an excitation signal that causes the vibratory resonator to vibrate in a vibration pattern and monitoring the vibration pattern with a first operational element and a second operational element. The first operational element produces a first signal indicative of a vibration characteristic of the vibration pattern present at a corresponding first location on the vibratory resonator, and the second operational element produces a second signal indicative of a vibration characteristic of the vibration pattern present at a corresponding second location on the vibratory resonator that is different from the first location. In response to an angular motion of the inertial sensor, the first signal undergoes a change in magnitude at a first rate of change and the second signal undergoes a change in magnitude at a second rate of change that is different than the first rate of change. A first relationship of respective amplitudes of the first signal and the second signal is used to measure a rate of the angular motion of the inertial sensor, and a second relationship of respective amplitudes of the first signal and the second signal is used to measure an amplitude of the excitation signal.

A further embodiment of the invention includes a system for measuring angular motion using a vibratory resonator having a plurality of operational elements that include a plurality of drive elements and a plurality of sensors. A drive circuit applies excitation signaling to the plurality of drive elements such that the vibratory resonator oscillates according to a vibration pattern that includes a plurality of nodes and anti-nodes, the excitation signaling including a first excitation signal applied to a first set of at least one drive element and a second excitation signal applied to a second set of at least one drive element. The relative amplitudes of the first and the second excitation signals control a positioning of the nodes and anti-nodes of the vibration pattern.

In another embodiment, a method for repositioning a vibration pattern of an inertial sensor that includes a vibratory resonator including a centerline axis and a plurality of operational elements situated about the centerline axis. The method involves applying a first drive signal to a first set of at least one operational element positioned along a first drive axis that intersects with the centerline axis to define a first orientation, and applying a second drive signal to a second set of at least one operational element positioned along a second drive axis that intersects with the centerline axis to define a second orientation having a rotational offset about the centerline axis from the first orientation. The applying of at least one of the first and second drive signals generates a vibration pattern that includes a plurality of anti-nodes having an angular distribution about the centerline axis, the angular distribution having an angle between adjacent ones of the plurality of anti-nodes, with the angle having a magnitude that differs from the rotational offset between the first and second drive axes. The relative amplitudes of the first and the second drive signals are adjusted to rotate the anti-node pattern to an arbitrary angular orientation about the centerline axis.

An advantage of some embodiments of the present invention is that symmetry of component placement in relation to the major axes of the vibration pattern may be partially maintained. While the offset angles preclude uniform angular spacing about the centerline axis of an axisymmetric or continuous body, the components are still in mirrored symmetry about the node reference axes or the anti-node reference axes, depending on the implementation. The partial symmetry promotes the uniform propagation of the oscillatory pattern.

It will be understood that references to relative terms such as upper and lower, front and back, left and right, or the like, are intended for convenience of description and are not contemplated to limit the present invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative and preferred embodiments of the instant invention.

Additional advantages and features are set forth in part in the description which follows, and in part, will become apparent to those skilled in the art upon examination of the following or may be learned by practice of the embodiments described herein.

DETAILED DESCRIPTION

Figure 1:
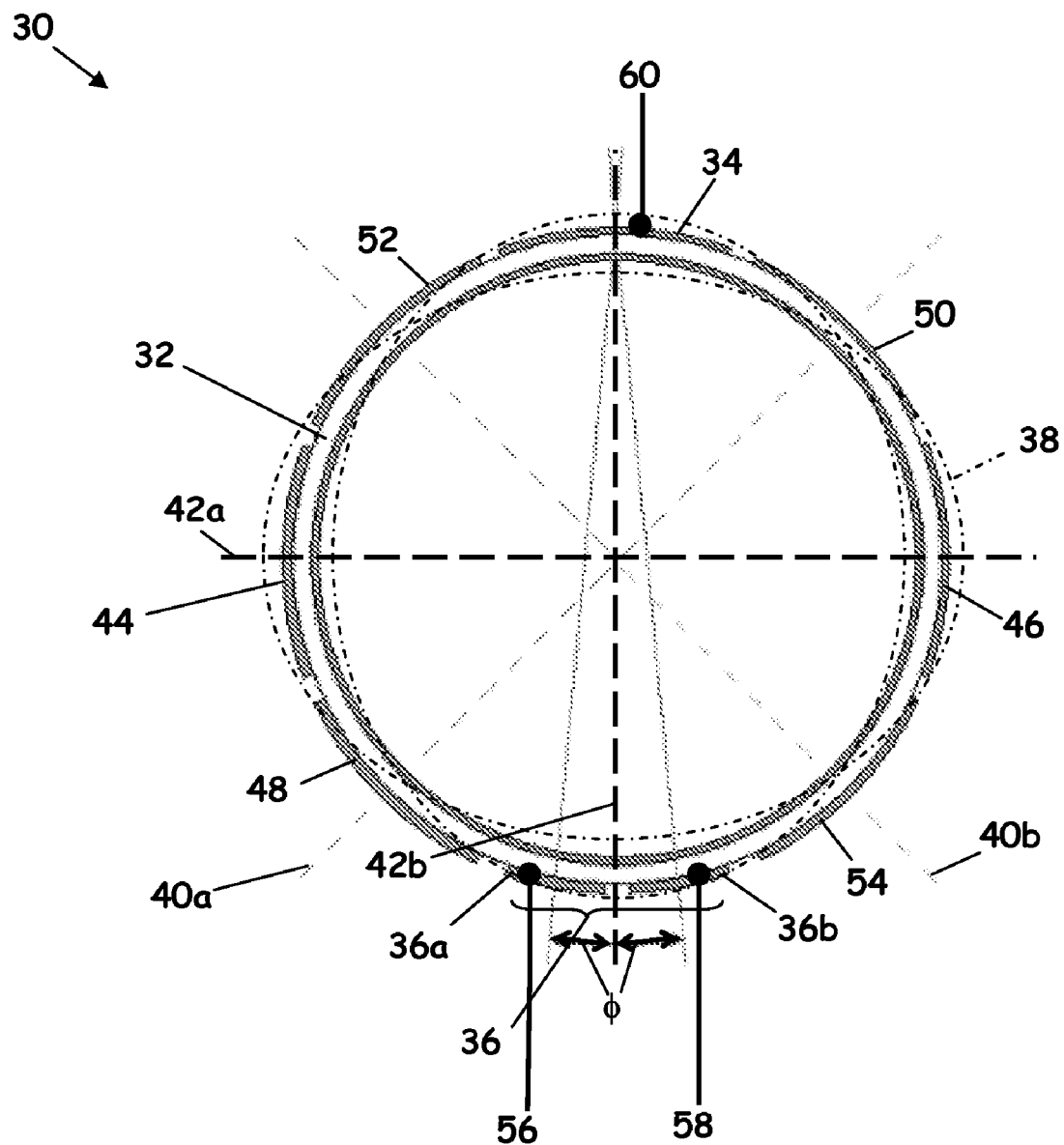
FIG. 1 is top view of a split drive electrode assembly for a cup electrode as known in the prior art.

Referring to FIG. 1, a split drive electrode assembly 30 for correcting undesirable oscillation alignment as is known in the prior art is depicted. The split drive electrode assembly 30 is comprised of a resonator 32 having a generally cylindrical cross-section and features two diametrically opposed drive electrodes 34 and 36, one of which is split into two electrically isolated electrodes 36a and 36b.

In operation, drive electrode 34 provides a drive signal to generate an oscillation or vibration pattern 38 (shown in phantom) characterized by a pair of node reference axes 40a and 40b, and a pair of anti-node reference axes 42a and 42b. The node reference axes 40a and 40b are defined by the points on the vibration pattern 38 where the amplitudes of the oscillation are at local minima. In contrast, the anti-node reference axes 42a and 42b are defined by the points on the vibration pattern 38 where the amplitudes of the oscillation are at local maxima. Functionally, the split drive electrode 36 provides a corrective drive signal that compensates for imperfections in the assembly that distort the oscillation pattern, such as electrode printing errors and mass differences in the conductor connections.

A pair of drive sense electrodes 44 and 46 sense the amplitude of the drive oscillation vector on the anti-node reference axis 42b, which, in an ideal system is the same as the amplitude induced by the drive electrodes 34 and 36 on the anti-node reference axis 42a. Accordingly, the drive sense electrodes 44 and 46 may provide a feedback signal to an automatic gain control or AGC (not depicted) for control of the drive amplitude delivered by the drive electrodes 34 and 36. The drive sense electrodes 44 and 46 are therefore dedicated to sensing the drive motion as an independent function and are not available to drive the cup oscillations.

A pair of node sense electrodes 48 and 50 are rotationally aligned with node reference axis 40a for sensing. Likewise, a pair of torque drive electrodes 52 and 54 are in rotational alignment with node reference axis 40b. The node sense electrodes on node reference axis 40a are connected together electrically and are dedicated to producing a rotation rate signal as an independent function. The torque drive electrodes 52 and 54 on node reference axis 40b are also connected together electrically, but are used to drive a "torquing" force on the cup as a dedicated and independent function.

In operation, a pair of drive voltages 56 and 58 are applied one each to the split drive electrodes 36a and 36b, respectively. The average of the voltages 56 and 58 set to equal a voltage 60 applied to the drive electrode 34. By adjusting the ratio of the voltages 56 and 58, the vibration pattern 38 may be rotated up to a displacement angle φ in either the clockwise or counterclockwise direction (i.e. a range from +φ to −φ).

In practice, the split drive plate is used only for static alignment, and does not augment active torque adjustment. The torque function typically involves sensing a rotation rate from the sense electrodes 48 and 50, processing that information, and driving the resonator 32 with the torque drive electrodes 52 and 54. The torquing signal polarity typically is set to counter the existing node vibrations and the gain in signal processing is used to set a bandwidth for the overall response of the gyroscope. The scheme is also be used to control quadrature signals in the sensing system. However, this method of active torque adjustment requires the dedication of a pair of electrodes to serve the torquing function that could otherwise be used for sensing purposes.

The technique of splitting one of the drive electrodes suffers from a number of shortcomings. In order to maintain symmetry of the oscillation, the mass and size of all of the elements are matched as closely as possible. The asymmetry introduced by splitting the one drive electrode 36 adversely affects the overall uniformity and ability to maintain the desired oscillation mode. Additionally, the split drive electrode 36 requires two conductor connections instead of the single conductor utilized on the other elements. The additional mass of the second connection introduces further asymmetry that is deleterious to resonance performance.

Figure 2:
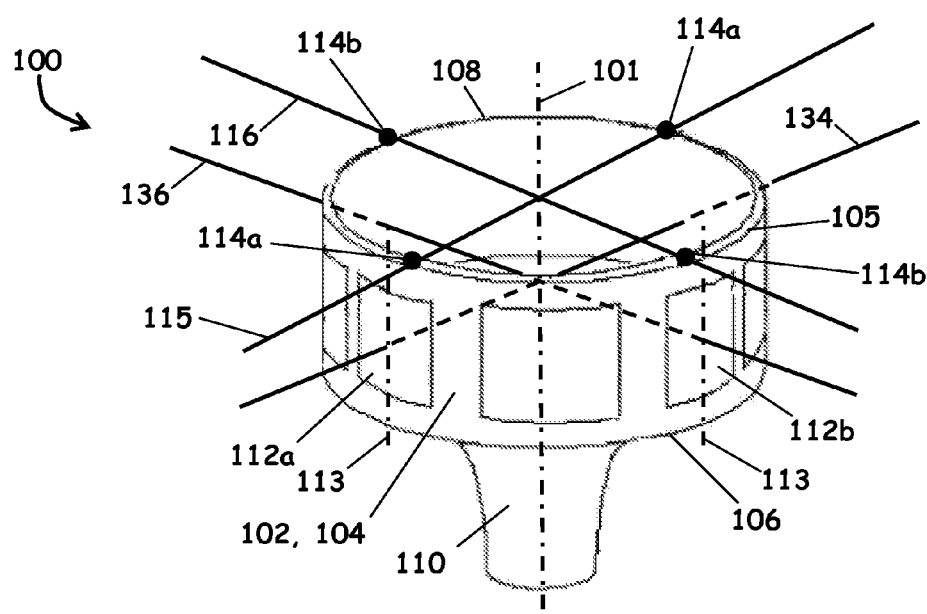
FIG. 2 is a perspective view of a gyroscope illustrating rotationally offset sense elements according to an embodiment of the present invention.
Figure 3:
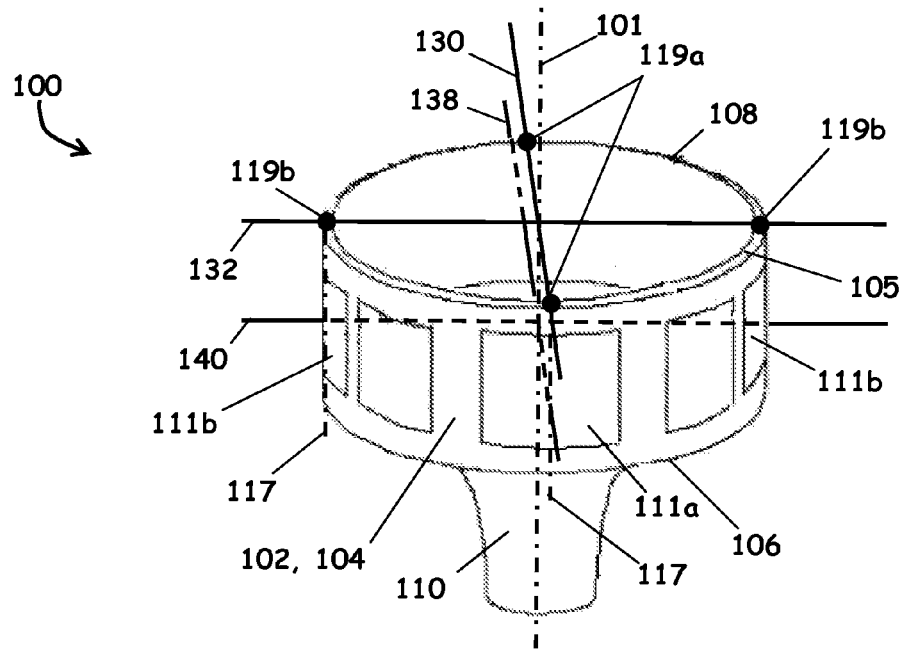
FIG. 3 is a perspective view of a gyroscope illustrating rotationally aligned drive elements according to the embodiment of FIG. 2.
Figure 4:
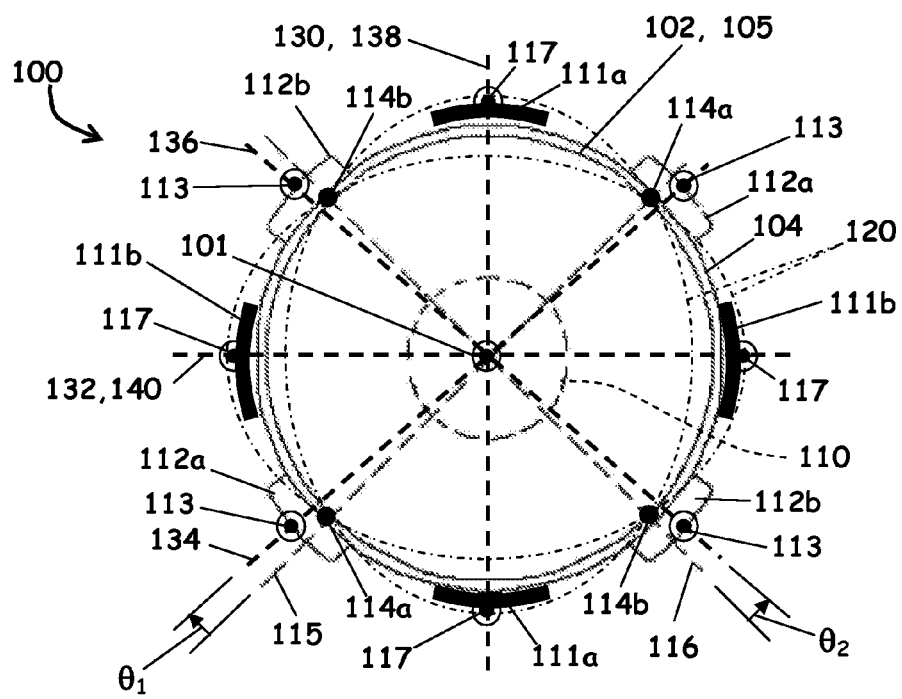
FIG. 4 is a top view of the gyroscope of FIGS. 2 and 3.

Referring now to FIGS. 2 through 4, an embodiment of the present invention in which an angular rate sensor is in the form of a cup assembly 100 is represented and described. The cup assembly 100 includes a resonant body 102 continuous about a centerline axis 101 and having an outer surface 104, a proximal end 106 and a distal end 108. A stem 110 depends from the proximal end 106, and the distal end 108 defines a rim 105. Two pairs of drive electrodes 111a and 111b and two pairs of sense electrodes or "pickoffs" 112a and 112b are attached or otherwise operatively coupled to the outer surface 104 of the resonant body 102 adjacent the rim 105.

For purposes of the description of the present invention, a "continuous" body or resonator is one having a cross-section that defines a closed loop on a plane that is orthogonal to a centerline axis of the body or resonator. The continuous body may take the form of a single piece or comprise multiple components that are combined to make the continuous cross-section. Likewise, a continuous length is one that forms a closed loop. In some embodiments of the present invention, the closed loop of the continuous body may be axisymmetric, where the term "axisymmetric" herein refers to being symmetric about an axis, such as in the centerline axis in the case of a cylinder or cone. Alternatively, continuous or noncontinuous bodies that are not axisymmetric, such as but not limited to bodies having elliptical, polygonal or irregular cross-sections, may be used as resonators in accordance with certain embodiments of the present invention where provisions are made to compensate or accommodate the non-symmetric nature of a closed loop on which a vibration pattern may be generated.

The term "electrode" as used herein may describe a conductor used to transmit signals or voltages both to and from a sense and/or drive element(s) and may also be used to refer to a portion or all of the sense and/or drive element(s) or a combination of the conductor(s) and/or sense and/or drive elements(s). A more generic descriptor is an "operational element," which is hereby defined for purposes of the present invention as an element that operates to either drive a vibration pattern or to sense a portion of a vibration pattern. Furthermore, an "operational element pair" is hereby defined for purposes of the present invention as a pair of operational elements wherein both operational elements of the pair operate to either drive or sense a vibration pattern.

Moreover, while the embodiments herein disclose operational element(s) in physical contact with the vibrating body, such as a coil, strip or plate, other embodiments exist wherein the operational element(s) are not in physical contact, such as with capacitive and magnetic field sensors and excitation mechanisms. Also, the drive and/or sense elements may utilize physical mechanisms other than an electrical signal, such as a mechanical, optical or thermal transfer of energy.

In one embodiment, each of the sense electrodes or elements in the 112a and 112b pairs is characterized by a central axis 113 that is parallel to the centerline axis 101. Likewise, each of the drive electrodes or elements of pairs 111a and 111b are characterized by a central axis 117 that is parallel to the centerline axis 101. Node reference axes 115 and 116 each pass through a pair diametrically opposed oscillation nodes 114a and 114b, respectively, intersecting at or near the centerline axis 101. The oscillation nodes 114a and 114b are defined by locations on the rim 105 at which the amplitude of the vibrations induced by the drive element pairs 111a and 111b are at a local minimum (i.e. substantially equidistant between the drive element pairs 111a and 111b).

It is noted that other embodiments may have elements with central axes 113 or 117 that are not parallel or substantially parallel to centerline axis 101. Examples include but are not limited to resonators having a hemispherical- or a frustum-shaped surface (not depicted), wherein the orientation of the central axis 113 or 117 of the respective sense or drive element is canted toward the centerline axis 101. For such geometries, central axes 113 and 117 are characterized as being in the same plane as the centerline axis 101.

In some conventional designs, the sense element pairs 112a and 112b are positioned on the outer surface 104 of the resonant body 102 so that the central axes 113 of the sense elements pass through the oscillation nodes 114a and 114b. In contrast, the embodiment of FIGS. 2 through 4 depicts the sense element pairs 112a and 112b as rotationally displaced with respect to the oscillation nodes 114a and 114b. For example, as depicted in FIG. 4, the sense element pair 112a is displaced clockwise from the node reference axis 115 that passes through oscillation nodes 114a, and the sense element pair 112b is displaced counterclockwise with respect to the node reference axis 116 that passes through oscillation nodes 114b.

A mode of vibration is represented by a vibration or oscillation pattern 120 (shown in phantom in FIG. 4) having the two node pairs 114a and 114b, each node being defined as a position on the vibration pattern where the amplitude of the vibration is at a local minima. The vibration pattern 120 may be carried on the rim 105 of the resonant body 102. The resonant body 102 may be of a variety of shapes, including, without limitation, a hemisphere, a cone, or other cup-shaped geometries. With a four-node vibration pattern, the nodes of the node pairs 114a and 114b define the node reference axes 115 and 116 as being substantially orthogonal to each other.

Vibration patterns also include a plurality of "anti-nodes," i.e. the location where the vibration pattern is at a local maxima. For the four-node vibration mode of vibration pattern 120, there are two anti-node pairs 119a and 119b, depicted in FIG. 3. Each anti-node pair 119a and 119b defines an anti-node reference axis 130 and 132, respectively. The central axes 117 of the drive element pairs 111a and 111b are aligned with the "anti-node" points of the oscillation pattern 120. The anti-node reference axes 130 and 132 are rotationally offset from the node reference axes 115 and 116 at substantially a 45° angle. Accordingly, anti-node reference axes 130 and 132 are also substantially orthogonal. Other modes of vibration may define a different number of nodes, and thus a different number of node reference axes and anti-node reference axes with different angular relationships. In some embodiments, a given oscillation pattern remains stationary on the resonant body when the gyroscope is rotationally stationary.

In the embodiment of FIGS. 2 through 4, a pair of sense element axes 134 and 136 are defined as passing through the centroids of sense element pairs 112a and 112b, respectively. Also, a pair of drive element axes 138 and 140 are defined as passing through the centroids of the drive element pairs 111a and 111b, respectively. The sense axes 134 and 136 may be located on substantially the same plane as the drive element axes 138 and 140 to maintain resonant symmetry. In these embodiments, the finite size of the various elements may cause the rim, and therefore the vibration pattern 120, to be on a plane that is distinct from the sense axes 134 and 136 and the drive element axes 138 and 140.

It is further recognized that paired operational elements are not required for all embodiments of the invention. An element that does not have a matching element in diametric opposition may also serve the same function. Accordingly, an alternative and more general definition of an operational element axis is one that passes through at least one operational element and intersects the centerline axis 101.

In FIGS. 3 and 4, the centroids of the drive element pairs 111a and 111b are in rotational alignment with the anti-node reference axes 130 and 132, whereas sense axes 134 and 136 are rotationally offset or "skewed" from the node reference axes 115 and 116, respectively, and each at respective skew angles $\theta_1$ and $\theta_2$.

In operation, the signal produced by each sense element pair 112a or 112b is proportional to the vibration amplitude at its location. At a given node, for example, vibratory movement may be substantially zero, and the signal received by a sense element located near that node may be at a minimum. In contrast, a sense electrode or element located at either of the anti-node reference axes produces a signal representative of the full drive vibration amplitude. Between these extremes the signal is generally proportional to the sine of a geometric constant times the angle $\theta_1$ or $\theta_2$ from the node. In a system having a vibration pattern characterized by two node reference axes, as in FIG. 4, the geometric constant is 2. More generally, the geometric constant is N, where N is the number of node reference axes in the vibration pattern.

In the embodiment of FIGS. 2 through 4, the skew angles $\theta_1$ and $\theta_2$ are in opposite rotational directions. That is, the skew angle $\theta_1$ of the sense axis 134 is rotationally offset in a clockwise direction from node reference axis 115, whereas the skew angle $\theta_2$ of the sense axis 136 is rotationally offset from node reference axis 116 in a counterclockwise direction.

Accordingly, in a system having the vibration pattern 120 characterized by the two node reference axes 115 and 116, the signals generated by the sense element pairs 112a and 112b located on the sense axes 134 and 136 are:

$$S_1 = D \cdot \sin(2\theta_1) + DK \qquad \text{Eqn. (1)}$$

$$S_2 = D \cdot \sin(2\theta_2) - DK \qquad \text{Eqn. (2)}$$

where $S_1$ is the combined signal from the first sense element pair 112a located on the first sense axis 134, $S_2$ is the signal from the second sense element pair 112b axis 136, D is the driven oscillation signal as would be sensed at the point of maximum oscillation at the anti-node reference axis 130, $\theta_1$ and $\theta_2$ are the magnitudes of the skew angles by which the sense axes 134 and 136 are offset with respect to the node reference axes 115 and 116, respectively, and DK is an angular rate sensing signal.

Signals $S_1$ and $S_2$ can manipulated to determine the drive sense signal D and the angular rate sensing signal DK. can be determined respectively. In particular, the rate sensing signal DK can be obtained as a function of the difference between the signals received from the sense element pairs 112a and 112b located on the sense element axes 134 and 136:

$$S_1 \cdot \sin(2\theta_2) - S_2 \cdot \sin(2\theta_1) = DK \cdot [\sin(2\theta_1) + \sin(2\theta_2)] \qquad \text{Eqn. (3a)}$$

The drive sensing signal D can be obtained as a function of the sum of the signals from the sense element axes:

$$S_1 + S_2 = D \cdot [\sin(2\theta_1) + \sin(2\theta_2)] \qquad \text{Eqn. (4a)}$$

Knowing $\theta_1$ and $\theta_2$ a priori, Eqns. (3) and (4) are solved for DK and D, respectively.

For systems where the skew angles $\theta_1$ and $\theta_2$ are substantially equal (i.e. $\theta_1 = \theta_2 = \theta$), the mathematical expressions simplify:

$$S_1 - S_2 = 2DK \qquad \text{Eqn. (3b)}$$

$$S_1 + S_2 = 2D \cdot \sin(2\theta) \qquad \text{Eqn. (4b)}$$

Figure 5:
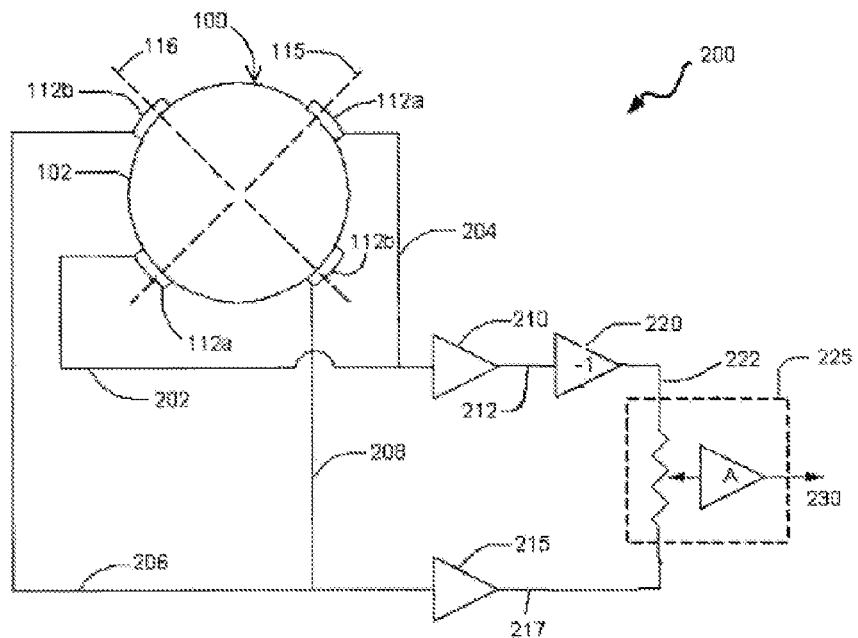
FIG. 5 is a schematic diagram illustrating an exemplary circuit that can monitor the sense elements and indicate of a rate of rotation of a gyroscope according to an embodiment of the present invention.

Referring to FIG. 5, a vibratory cup system 200 including the cup assembly 100 and control circuitry used to control the orthogonality between the two sense element pairs 112a and 112b is portrayed. Signal lines 202 and 204 transmit signals from the sense element pair 112a through a buffer 210.

Functionally, the buffer 210 produces a buffered sense output 212 indicative of the angular orientation of the node reference line 115 relative to the sense axis 134. Similarly, signal lines 206 and 208 transmit signals from the sense element pair 112b through a buffer 215 to produce a buffered sense signal 217 that represents the angular orientation of the node reference axis 116 relative to the sense axis 136. More generally, the buffered sense signals 212 and 217 may be conditioned in addition to, or in ways other than by the buffering arrangement, as would be known to persons skilled in the art.

In one embodiment, an inverter 220 produces an inverted sense signal 222 having an opposite polarity relative to the sense signal 217. A potentiometer 225 receives the conditioned sense signal 217 and the inverted sense signal 222. The potentiometer 225 serves as an adjustable mixer that weights or adjusts the ratio between the conditioned sense signal 217 and the inverted sense signal 222 to produce a weighted ratio signal 230 that may be used to electrically position the node reference axes 115 and 116 relative to the sense element pairs 112a and 112b. In this way, the setting of the potentiometer 225 for minimal drive signal at 230 (i.e. the purest rate signal) can be determined.

Figure 6:
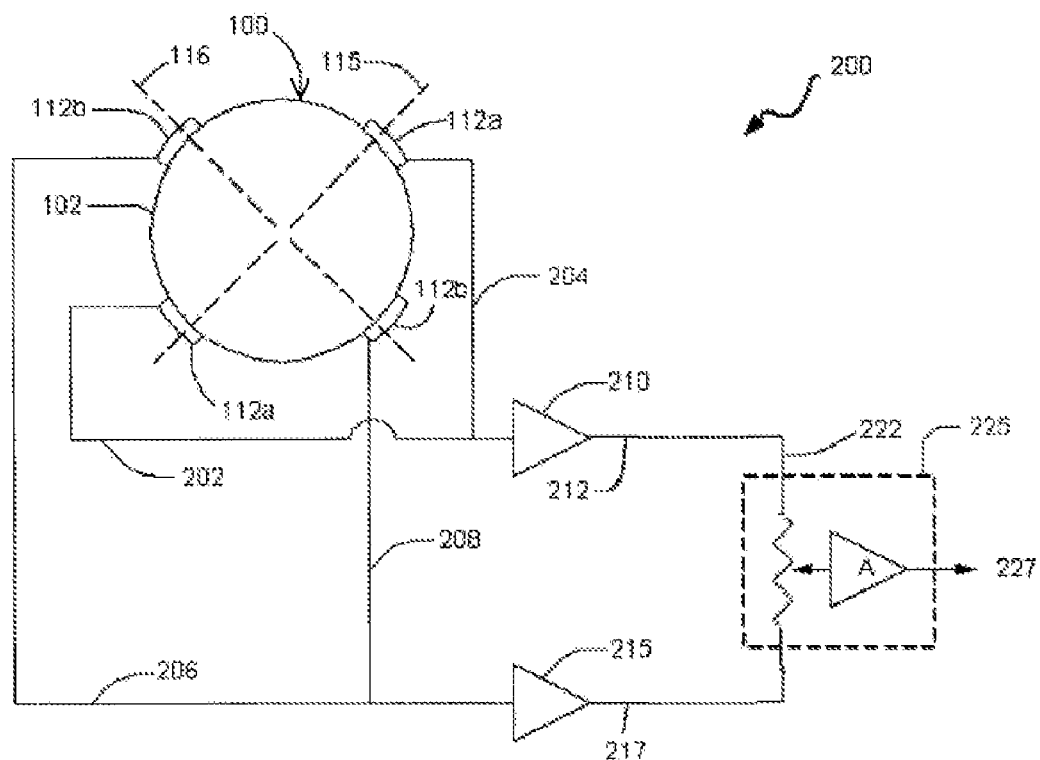
FIG. 6 is a schematic diagram illustrating an exemplary control circuit that can monitor the sense elements and provide an indication related to the applied drive signal according to one embodiment the present invention.

Referring to FIG. 6, an alternative embodiment is depicted wherein the inverter 220 is omitted, thereby additively mixing or combining the buffered sense signal 212 and the buffered sense signal 217. In this alternative implementation, the rate sense signal is canceled. By omitting the inverter 220, the predominant signal may be derived from the drive oscillation, and the potentiometer 225 weights or adjusts out the rate signal, providing only the drive sensing signal at 227 which may be used to provide correction in a drive amplitude feedback loop, as described more fully below in connection with FIG. 15. Both functions can be implemented at the same time using signals 217 and 212 as the root of both operations.

Figure 7:
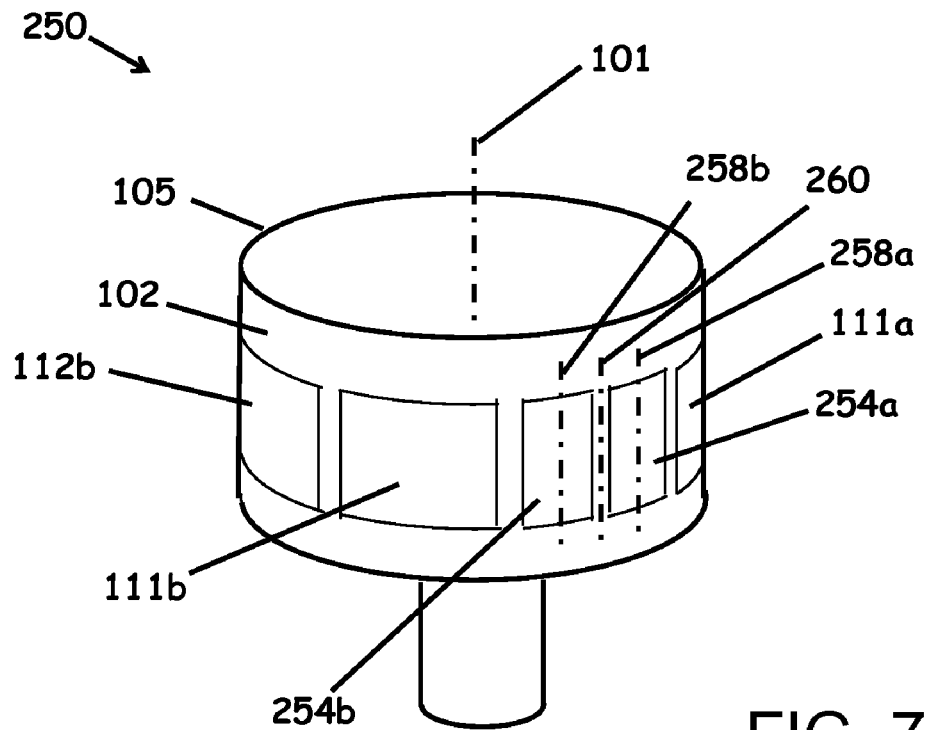
FIG. 7 is a perspective view of a single split-element configuration in an embodiment of the present invention.
Figure 8:
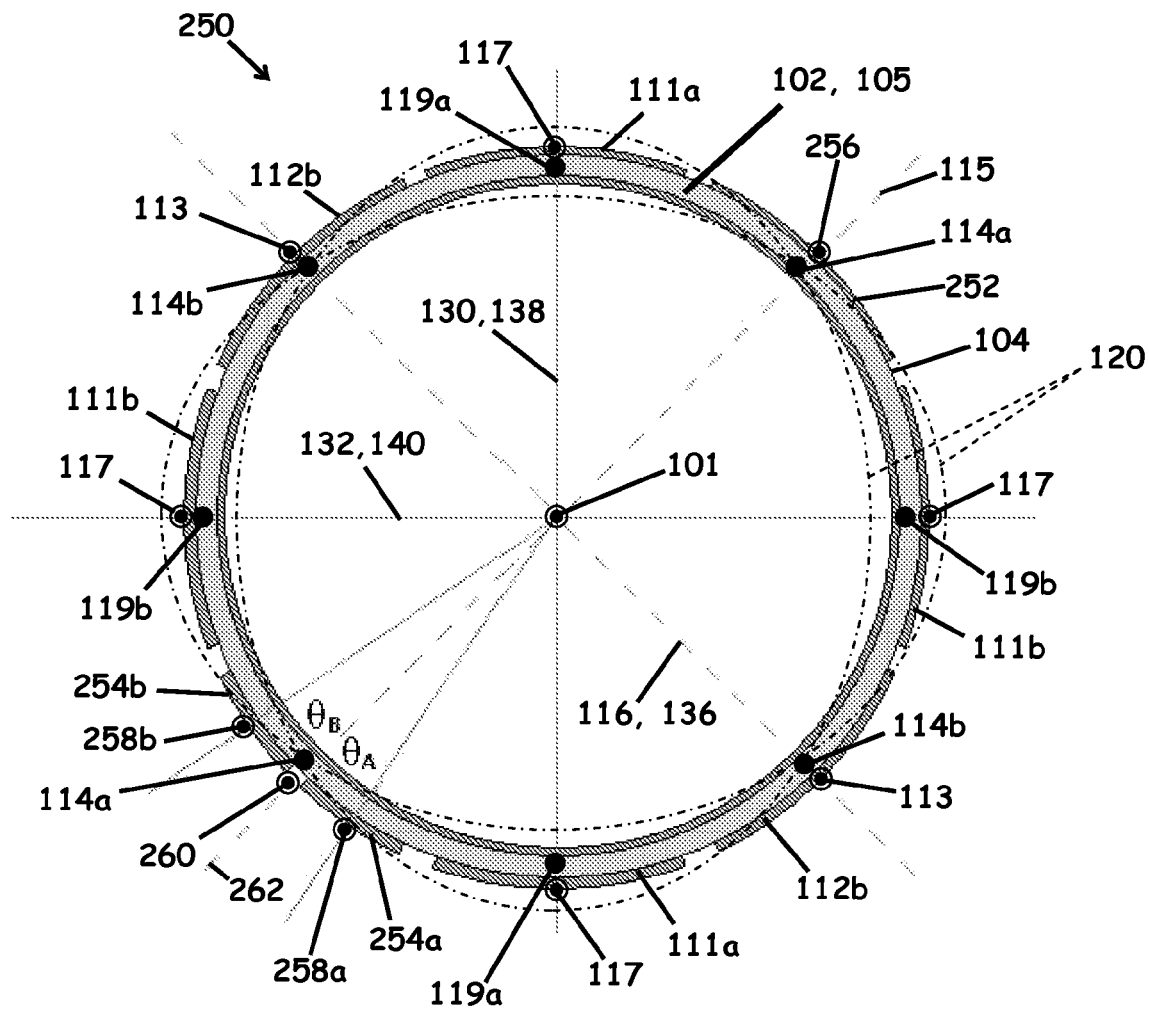
FIG. 8 is a cross-sectional view of the single split-element configuration of FIG. 7.

Referring to FIGS. 7 and 8, a cup assembly 250 is depicted utilizing a split sensing configuration in an embodiment of the invention. The cup assembly 250 includes many of the same characteristics as the cup assembly 100 embodiment depicted in FIGS. 2 through 4. Specifically, the cup assembly 250 includes the resonant body 102 continuous about the centerline axis 101, the outer surface 104, and the two pairs of diametrically opposed drive elements 111a and 111b, each the drive elements having the central axis 117 and defining the drive element axes 138, 140. The opposed drive elements 111a and 111b are attached or otherwise operatively coupled to the outer surface 104 of the resonant body 102 adjacent the rim 105. The drive element pairs 111a and 111b, when activated, generate the vibration pattern 120 characterized by the node pairs 114a and 114b defining the node reference axes 115 and 116 and the anti-node pairs 119a and 119b defining the anti-node reference axes 130 and 132.

The cup assembly 250 as depicted in FIGS. 7 and 8 also includes a trio of sensing elements 252, 254a and 254b. The sensing element 252 is characterized by a central axis 256 that is parallel to the centerline axis 101 and is operably engaged with the resonant body 102 at a location substantially equidistant between drive axes 138 and 140. The sensing elements 254a and 254b are each characterized by a central axis 258a and 258b, respectively, and are located adjacent each other to define a combined central axis 260 substantially equidistant between central axes 258a and 258b. The sensing elements 254a and 254b may be operably engaged with the resonant body 102 at a location such that the combined central axis 260 is substantially in diametric opposition with the central axis 256 of the sensing element 252. A first sensing axis 262 passes through the central axes 256 and 260. In this embodiment, the central axes 258a and 258b are rotationally offset from the first sensing axis 262 by angles $\theta_A$ and $\theta_B$, respectively, that are offset in opposite directions relative to the first sense axis 262. The angles $\theta_A$ and $\theta_B$ may or may not be of equal magnitude.

The sensing elements 254a and 254b may be of different or equal sizes and may combine to occupy substantially the same footprint as the sensing element 252. The cup assembly 250 may also include the second sense element pair 112b in diametric opposition and defining a second sense axis 136 that is generally orthogonal with first sensing axis 262, as depicted in FIG. 8.

In operation, the sensing elements 254a and 254b produce signals in proportion to the amplitude of the vibration pattern 120 at their respective location. As discussed above, the magnitude of the amplitude of the vibration pattern 120 is at a minimum at the node pairs 114a and 114b (i.e. along node reference axes 115 and 116) and will increase sinusoidally between the nodal and antinodal extremes, as explained in the discussion attendant Eqns. (1) and (2). In an ideally constructed product, the node reference axis 115 is in the same angular orientation with respect to the centerline axis 101 as the first sensing axis 262. Accordingly, the signals generated by the sensing elements 254a and 254b are $$S_1 = D \cdot \sin(2\theta_A) + DK \qquad \text{Eqn. (5)}$$

$$S_2 = -D \cdot \sin(2\theta_B) + DK \qquad \text{Eqn. (6)}$$

where the variables are as defined for Eqns. 1 and 2. the rate sensing signal DK and subtracted to give the drive sensing signal D:

$$S_1 \cdot \sin(2\theta_B) + S_2 \cdot \sin(2\theta_A) = DK \cdot [\sin(2\theta_A) + \sin(2\theta_A)] \qquad \text{Eqn. (7a)}$$

The drive sensing signal D can be obtained as a function of the sum of the signals from the sense element axes:

$$S_1 - S_2 = D \cdot [\sin(2\theta_A) + \sin(2\theta_B)] \qquad \text{Eqn. (8a)}$$

Knowing $\theta_A$ and $\theta_B$ a priori, Eqns. (7a) and (8a) are solved for DK and D, respectively. For configurations where $\theta = \theta_A = \theta_B$, the equations reduce to $$S_1 + S_2 = 2DK \qquad \text{Eqn. (7b)}$$

$$S_1 - S_2 = 2D \cdot \sin(2\theta) \qquad \text{Eqn. (8b)}$$

Figure 9:
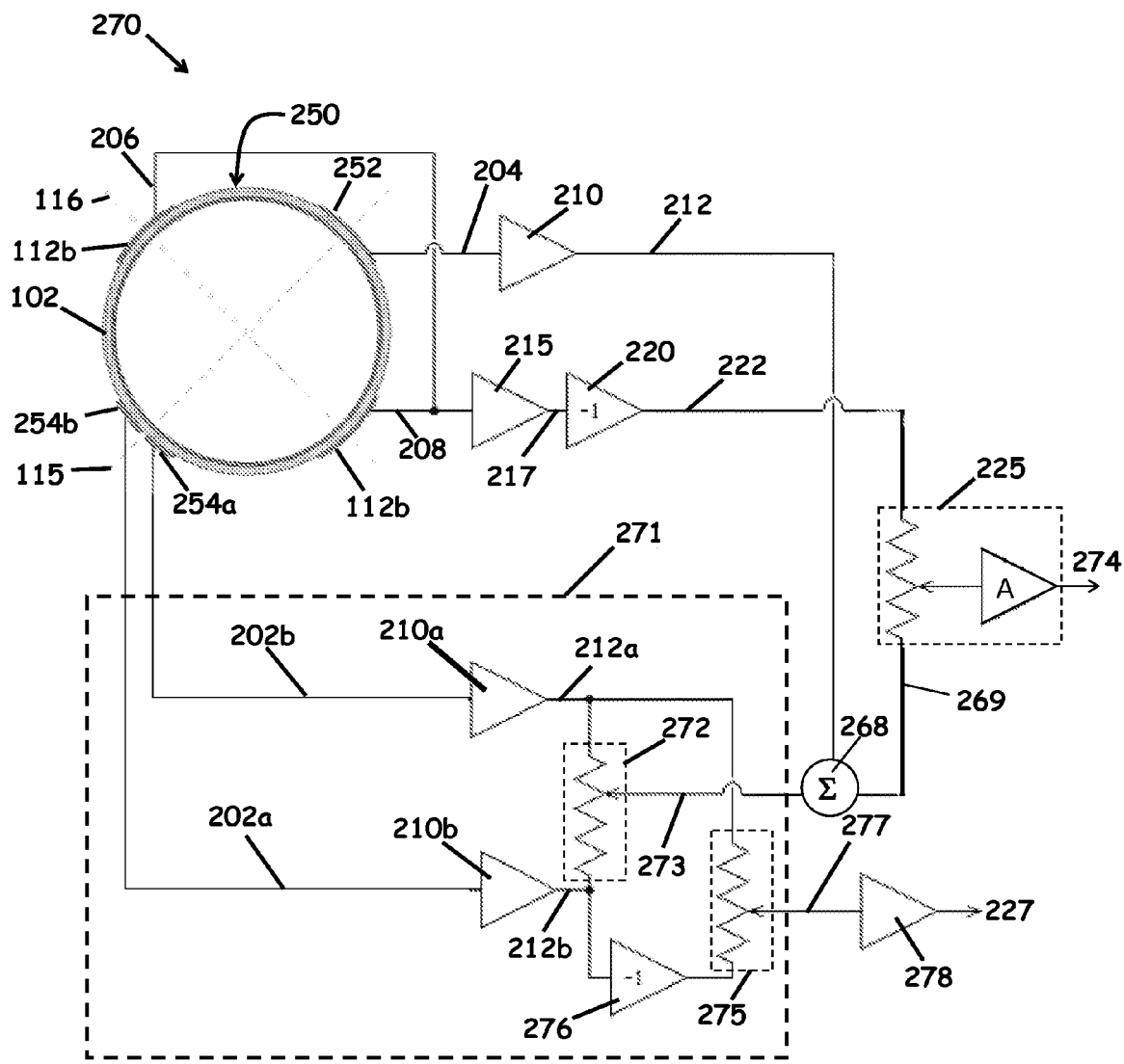
FIG. 9 is a schematic of a combined rate and drive sense circuit for a single split-element configuration in an embodiment of the present invention.

Referring to FIG. 9, a rate and drive sense circuit 270 for the split sensing configuration is depicted according to an embodiment of the invention. Components having the same functions as in FIGS. 5 and 6 are identified by the same numerical reference. A split element sensing circuit 271 is presented in connection with the split sensing elements 254a and 254b. The split element sensing circuit 271 includes signal lines 202a and 202b that transmit signals from the split sense elements 254a and 254b through buffers 210a and 210b, which output signals 212a and 212b into a rate output adjusting potentiometer 272. An adjustable output 273 is transmitted from the rate output adjusting potentiometer 272 and summed at a summing junction 268 with the buffered signal 212 to produce a signal 269 that is routed to the potentiometer 225 for adjustment relative to the inverted and buffered signal 222 from the orthogonal sensing element pair 112b to produce a rotation rate signal 275.

For the rate and drive sense circuit 271, the output signals 212a and 212b are also split and routed into a drive output adjusting potentiometer 275, with one of the output signals (212b in the FIG. 9 depiction of the embodiment) being inverted en route with an inverter 276. The drive output adjusting potentiometer 275 puts out an adjustable signal 277 that is routed through an amplifier 278 to produce the drive sensing signal 227.

Functionally, the potentiometers 272 and 275 enable adjustments in the gain balance between the outputs of the two sensing elements 254a and 254b for the correction of imperfections such as alignment errors. (The potentiometer 225 serves the same function as in the discussions of FIGS. 5 and 6.) Separating the correction of the rotation rate signal 274 and the drive sensing signal 227 enables optimization of both signals.

Figure 10:
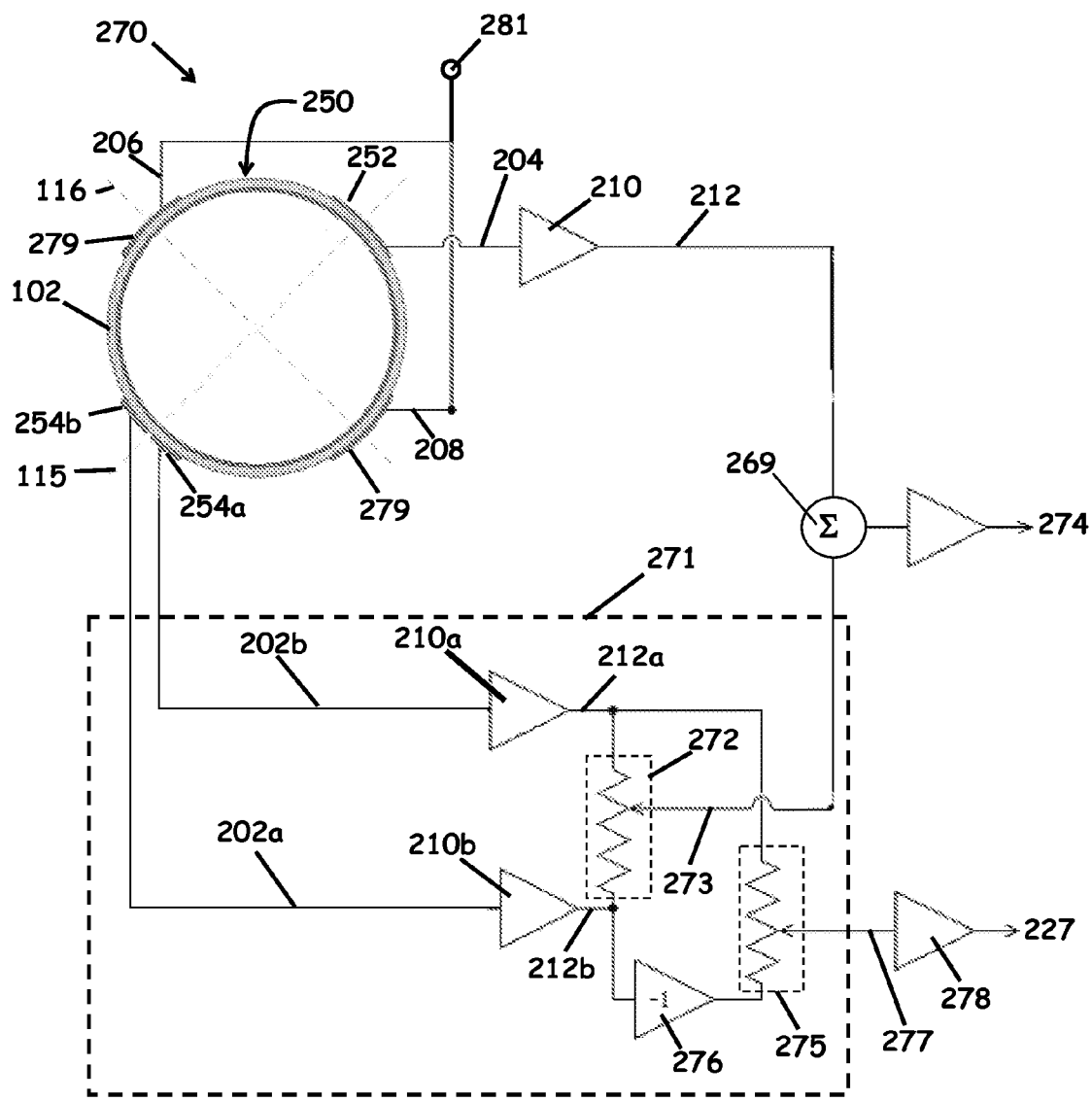
FIG. 10 is a schematic of a combination rate sense, drive sense and active torquing circuit in an embodiment of the present invention.

Referring to FIG. 10, an alternative to the embodiment of FIG. 9 is presented that utilizes a drive element pair 279 in place of the sensing element pair 112b to enable active torquing. A torque signal 281 is provided to the drive element pair 279.

Figure 11:
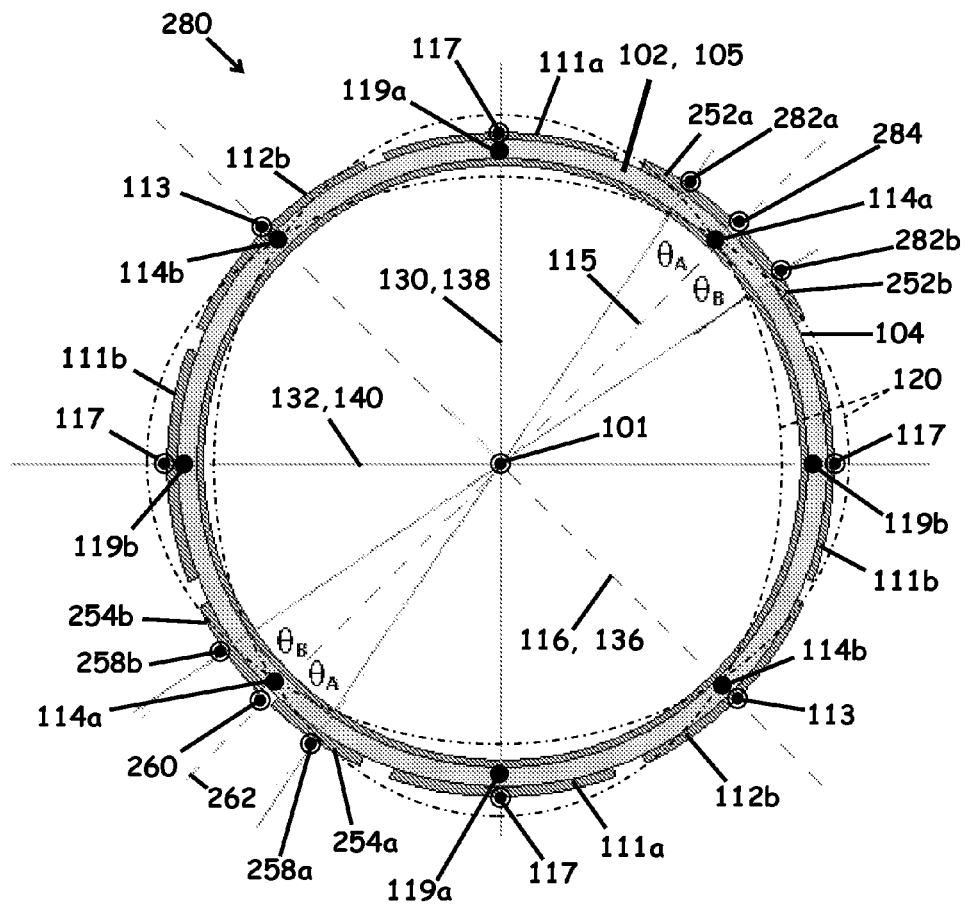
FIG. 11 is a cross-sectional view of a dual split-element configuration in an embodiment of the present invention.

Referring to FIG. 11, a cup assembly 280 is depicted in cross section utilizing a dual split sensing configuration in an embodiment of the invention. The cup assembly 280 includes many of the same characteristics as presented in the discussion of FIGS. 7 and 8. In addition, the sensing element 252 of FIG. 8 is replaced with a split element having sensing elements 252a and 252b. Like the sensing elements 254a and 254b, the sensing elements 252a and 252b are each characterized by a central axis 282a and 282b, respectively, each being substantially parallel to the centerline axis 101 and being adjacent each other to define a combined central axis 284 substantially equidistant between central axes 282a and 282b. The sensing elements 252a and 252b are operably engaged with the resonant body 102 at locations such that the combined central axis 284 is substantially in diametric opposition with the combined central axis 260 of the sensing elements 254a and 254b. In the embodiment depicted in FIG. 8, the first sense axis 262 passes through the combined central axes 260 and 284 and is substantially orthogonal to the second sense axis 136. The first sense axis 262 is substantially rotationally equidistant between the adjacent drive element axes 138 and 140.

The sense elements 252a and 254a may be located such that the respective central axes 282a and 258a are in diametric opposition. Accordingly, the central axis 258a is rotationally offset from the first sense axis 262 by the same magnitude and in the same rotational direction as sense element 254a, i.e. by angle $\theta_A$. Likewise, central axis 258b of sensing element 254b may be in diametric opposition to the central axis 282b of sense element 252b to define a rotational offset equal in magnitude and direction to angle $\theta_B$. The offset angles $\theta_A$ and $\theta_B$ may or may not be of equal magnitude.

In operation, sensing elements 252a and 252b of the cup assembly 280 produce signals that are substantially a duplication of the signals produced by sensing elements 254a and 254b. Specifically:

$$S_3 = D \cdot \sin(2\theta_A) + DK \quad \text{Eqn. (9)}$$

$$S_4 = -D \cdot \sin(2\theta_B) + DK \quad \text{Eqn. (10)}$$

where $S_3$ and $S_4$ are the signals derived from sensing element 252a and 252b, respectively. The remaining variables are as defined for Eqns. 1 and 2. The sensing signal DK can be determined by adding signals $S_3$ and $S_4$ to the signals $S_1$ and $S_2$, respectively, and treated according to the expression:

$$(S_1+S_3)\cdot\sin(2\theta_B)+(S_2+S_4)\cdot\sin(2\theta_A)=2DK\cdot[\sin(2\theta_A)+\sin(2\theta_A)] \quad \text{Eqn. (11a)}$$

The signals $S_3$ and $S_4$ may be subtracted and their difference added to the difference in Eqn. (8), from which the drive sensing signal D may be derived according to the equation $$(S_1-S_2)+(S_3-S_4)=2D\cdot[\sin(2\theta_A)+\sin(2\theta_B)] \quad \text{Eqn. (12a)}$$

Again, by knowing $\theta_A$ and $\theta_B$ a priori, Eqns. (11a) and (12a) are solved for DK and D, respectively. For embodiments where angles $\theta_A$ and $\theta_B$ are substantially equal ($\theta=\theta_A=\theta_B$), the expressions simplify to $$S_1+S_2+S_3+S_4=4DK \quad \text{Eqn. (11b)}$$

$$S_1-S_2+S_3-S_4=4D\cdot\sin(2\theta) \quad \text{Eqn. (12b)}$$

Functionally, the cup assembly 280 offers redundancy in the determination of the drive sensing signal D. The redundancy may be utilized to improve the signal-to-noise ratio of the drive sensing measurement. Consider that the dual split plate configuration may provide twice the signal because there is twice the sensing area when two split plates are used. Moreover, because two drive sensing signals are generated, the noise is statistically reduced to half that of a single signal. Thus, the signal may be doubled and the noise halved, resulting in a four-fold increase in the signal-to-noise ratio over the single split plate configuration.

The dual split element configuration of the cup assembly 280 offers a further advantage in that it is more symmetrical than the single split element configuration of cup assembly 250. The dual split element cup assembly 280 restores the "mirrored symmetry" provided by the skewed element configuration of FIG. 4.

Figure 12:
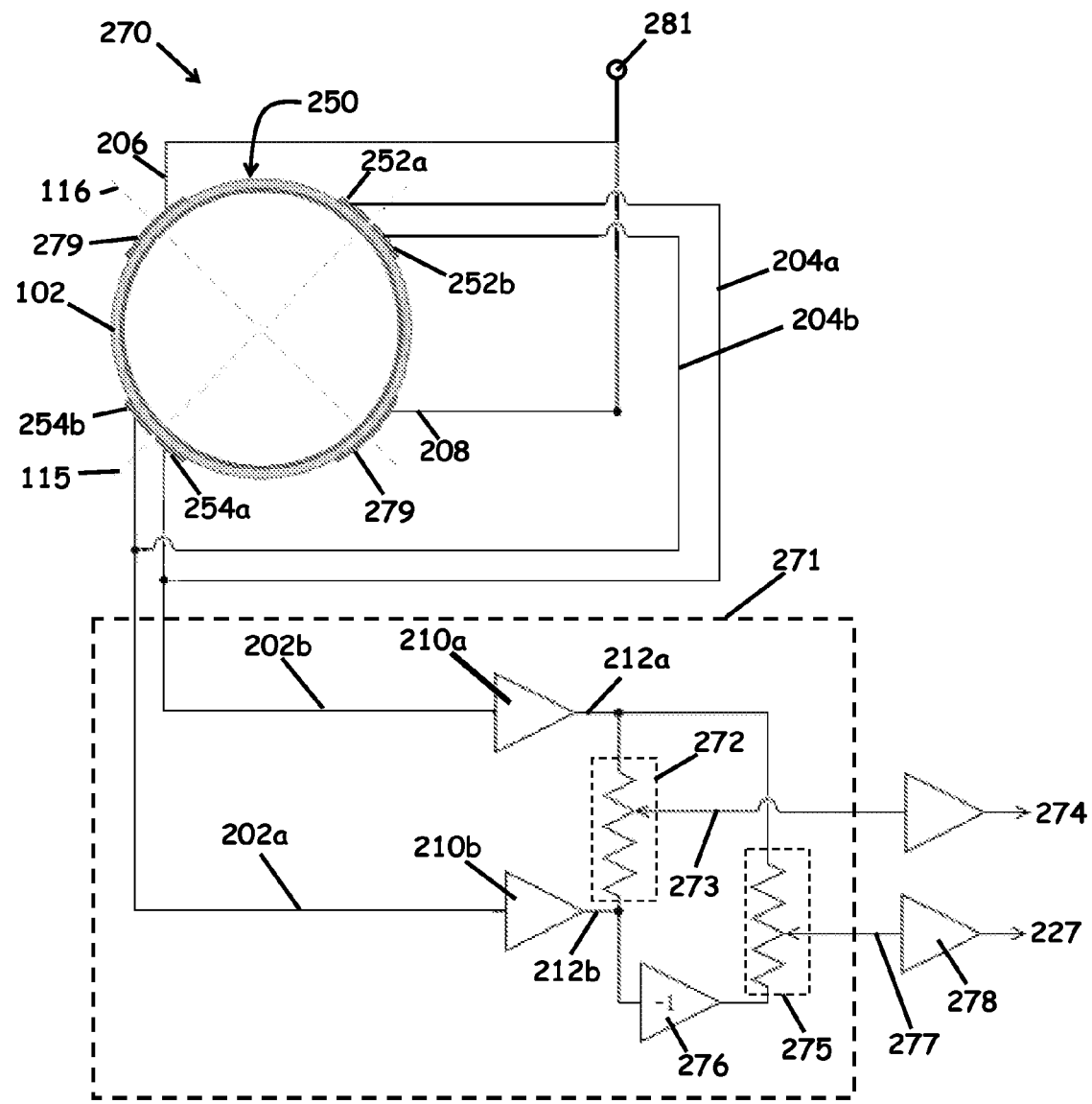
FIG. 12 is a schematic of a combined rate and drive sense circuit for a dual split-element configuration in an embodiment of the present invention.

Referring to FIG. 12, a rate and drive sense circuit 271 for the split sensing configuration is depicted according to an embodiment of the invention. The split sensing element circuit 271 is as presented in the discussion of FIG. 9. A pair of signal lines 204a and 204b that transmit signals from the split sense elements 252a and 252b and are added to output signals 202a and 202b, respectively.

Additionally, the signals from the 252a and 252b sensing elements may be conditioned separate from the signals received from the 254a and 254b sensing elements to provide an independent measurement of the rotation rate and drive signals. Such independent measurement is accomplished by implementing a second split element sensing circuit (not depicted) in connection with the split sensing elements 252a and 252b instead of split sensing elements 254a and 254b. The outputs of the two independent sense circuits 271, that is 274 and 337 from each of their respective circuits 271 would be added to produce a more stable averaged signal.

Figure 13:
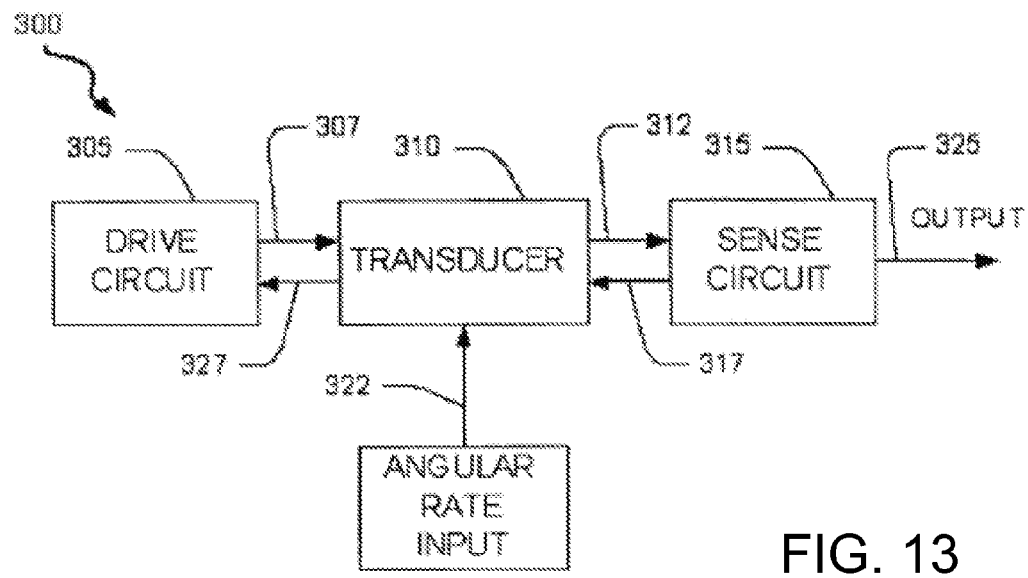
FIG. 13 is a generalized control diagram of a vibrating structure gyroscope according to an embodiment of the present invention.

Referring to FIG. 13 a generalized diagram of a vibrating structure gyroscope 300 (VSG) is depicted. A drive circuit 305 applies a controlled vibration 307 to a transducer 310, such as a cup electrode or other type of transducer, including, but not limited to, ring- and plate-type transducers. The transducer 310 transfers a portion of the vibration 307 to a sensing circuit 315 as a sensed vibration signal 312 when an angular motion 322 is applied, for example, when the gyroscope 300 is rotated from a nominal steady-state position. The sense circuit 315 transforms the sensed vibration signal 312 to produce an output signal 325 representative of the angular position change caused by rotation of the VSG 300. The sense circuit 315 additionally provides a feedback signal 317 to the transducer 310 to modify the response of the output signal 325. A control signal 327 may be produced by the transducer 310 and used by the drive circuit 305 to control the level of oscillation which in turn controls the sensitivity of the gyroscope 300. One purpose of the feedback signal 317 is to counteract the vibrations from angular motions in the transducer thereby lowering the quality factor Q of the transducer and thus increasing the system bandwidth.

Figure 14:
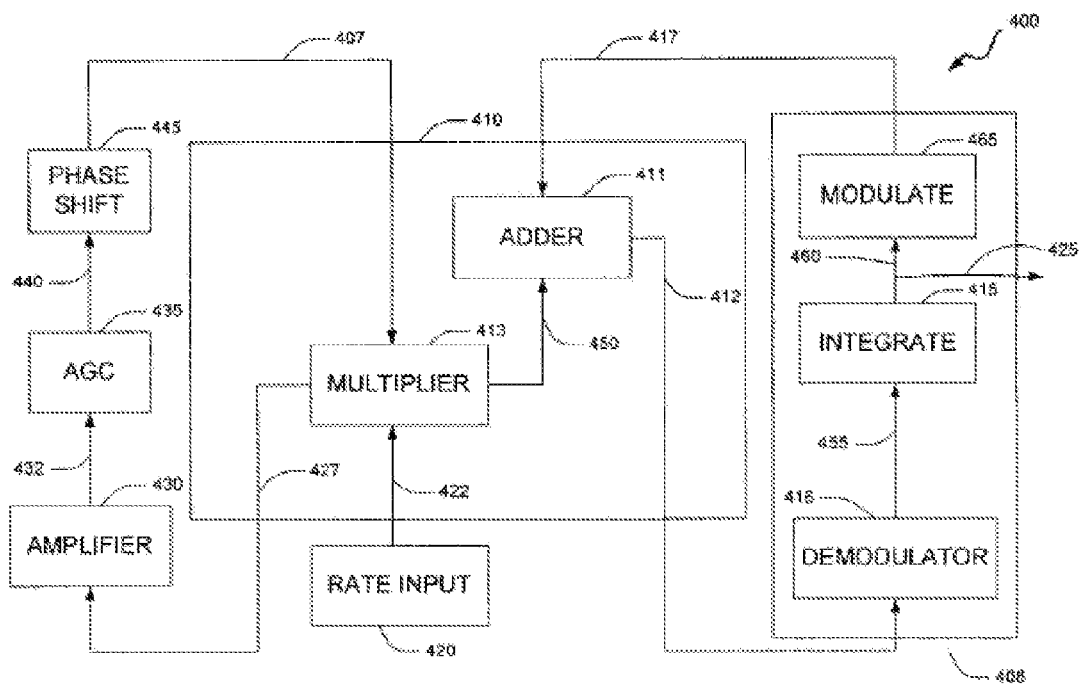
FIG. 14 is a block diagram of components of an example gyroscope model for use within a gyroscope system according to an embodiment of the present invention.

Referring to FIG. 14, an embodiment of the present invention is depicted that may be used within a gyroscope system. A gyroscope system 400 incorporates drive and sense circuits. A drive signal 407 passes to a transducer 410, which includes a phase shift function, an adder 411, and a multiplier 413. The multiplier 413 processes the drive signal 407. In particular, the multiplier 413 modulates an angular rate signal 422 from an angular rate input 420 as a function of the drive signal 407. The driven oscillations are monitored through a drive sense signal 427. The drive sense signal 427 may be transmitted to an amplifier 430 to produce an amplified drive correction signal 432 that may in turn be transmitted to an automatic gain control (AGC) circuit 435. The AGC circuit 435 may then produce an adjusted drive signal 440 tailored to overcome inaccuracies and to provide sufficient amplitude to maintain consistent drive to the transducer in the transducer 410. The adjusted drive signal 440 may be further processed by a phase shifter 445 to correct any phase shift that resulted within the transducer and during the signal processing and produces the drive signal 407.

The multiplier 413 in the embodiment of FIG. 14 generates a force signal 450 based upon the angular rate signal 422. The force signal 450 may be transmitted to the adder 411 to be added to a control signal 417, producing a vibration signal 412. The vibration signal 412 may then be transmitted to a sensing demodulator 416, which produces a rectified sine wave signal 455. An integrator 415 may further process the rectified sine wave signal 455 to produce an output signal 425 representative of the angular position change caused by gyroscope rotation. The integrator 415 also transmits an adjusted output signal 460 to a modulator 465, which converts the adjusted output signal 460 to the control signal 417. In this way, the system realizes a closed loop or torque loop 408 that seeks to force the vibrations at the sense element pairs 112a and 112b to zero. The torque loop 408 provides improved bandwidth and linearization of the gyroscope system 400. The effect of the torque loop 408 is to rotate the oscillation pattern to reduce transducer vibration in the sense direction, to assist the dissipation of sense deflections, and to serve as an effective method to increase the bandwidth of the rate signals in conditions of systems having a high quality factor Q.

Figure 15:
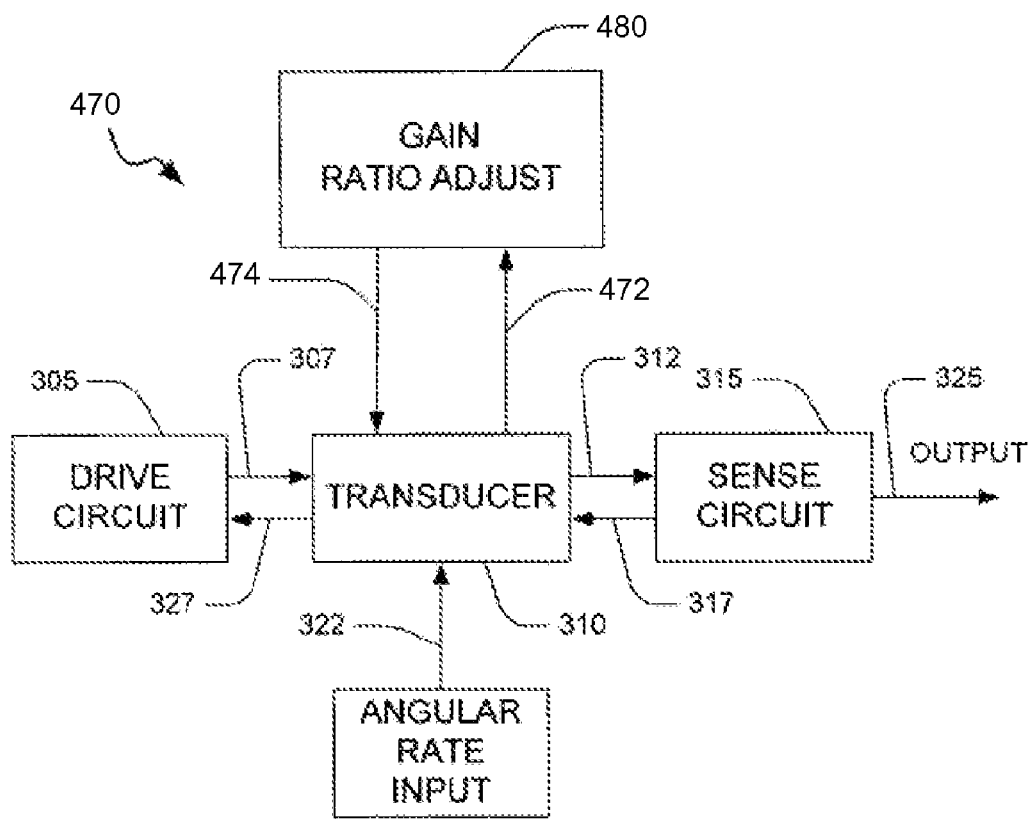
FIG. 15 illustrates an embodiment with the gain ratio adjust circuitry incorporated into a gyroscope system according to an embodiment of the present invention.

Referring to FIG. 15, an embodiment that incorporates a gain ratio adjustment subsystem 480 into a gyroscope system 470 is depicted. The gain ratio adjustment subsystem 480 may comprise an angular rate sensing, a drive vibration sensing, or both in combination, as described above. For example, the control signal 327 may be adjusted to be all drive vibration sensing signal and the sensed vibration signal 312 may be adjusted to be all rate sensing signal. The gain ratio adjustment subsystem 480 receives as input a gain input signal 472, for example, via the sense signal lines 202, 204, 206 and 208 of FIG. 5.

In one embodiment, the gain ratio adjustment subsystem 480 of FIG. 15 may be used to adjust the alignment of the sense axes 134 and 136. With an ideal product, the two sense element axes 134 and 136 are perfectly aligned (i.e. are offset by the same skew angle θ). However, with a real world product, the two sense element axes 134 and 136 are not in perfect alignment. By making slight adjustments in the gain balance between the two sense outputs via the gain ratio adjustment subsystem 480 of FIG. 15, alignment errors can be compensated.

Figure 16:
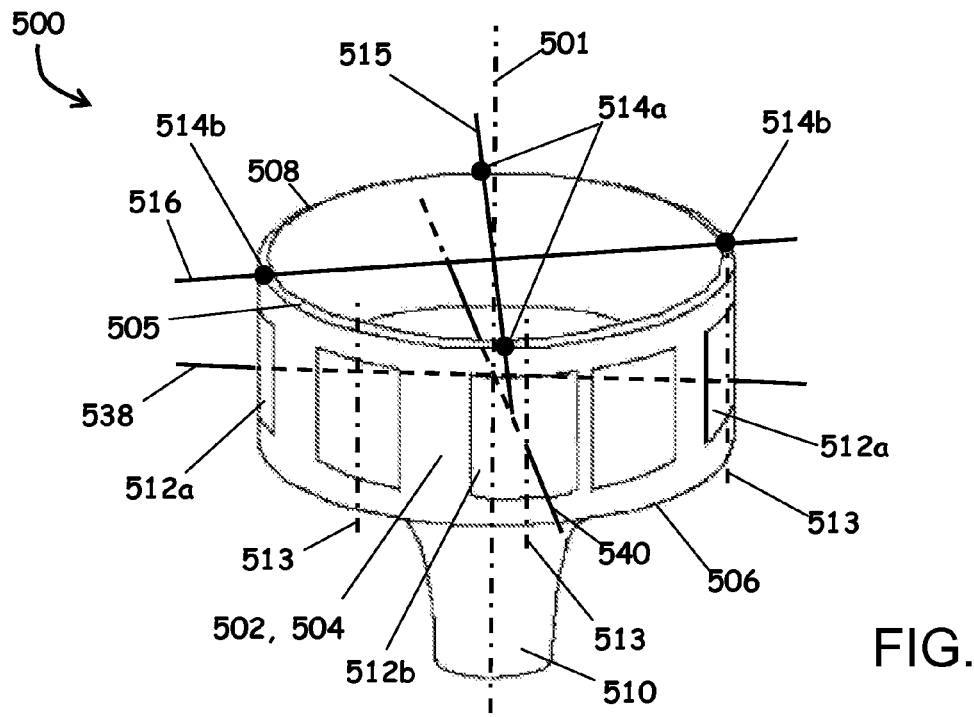
FIG. 16 illustrates a perspective view of an embodiment of the present invention highlighting the rotationally offset drive elements.
Figure 17:
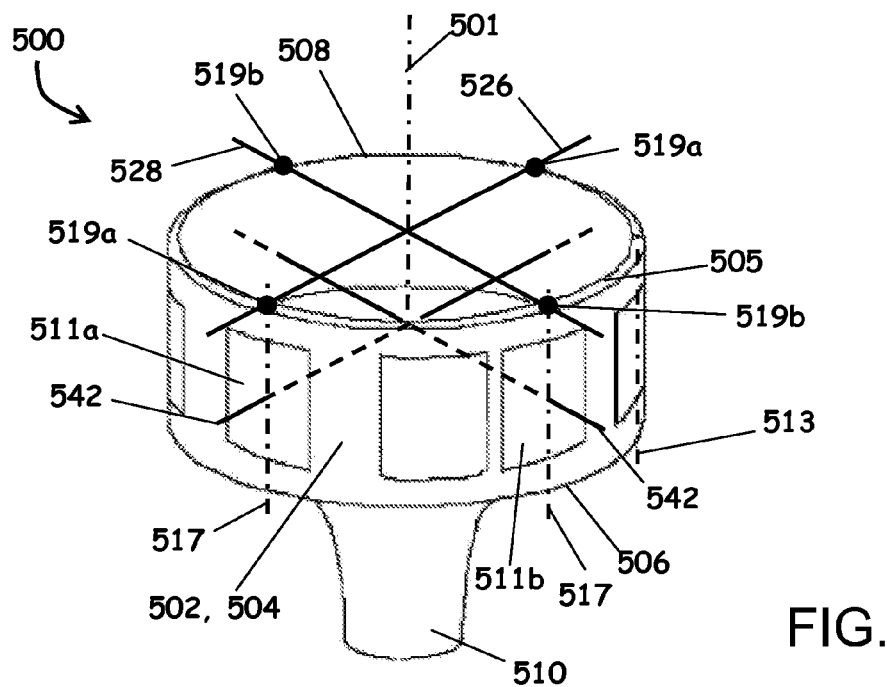
FIG. 17 illustrates a perspective view the embodiment of FIG. 16 highlighting aligned rotationally aligned sensing elements.
Figure 18:
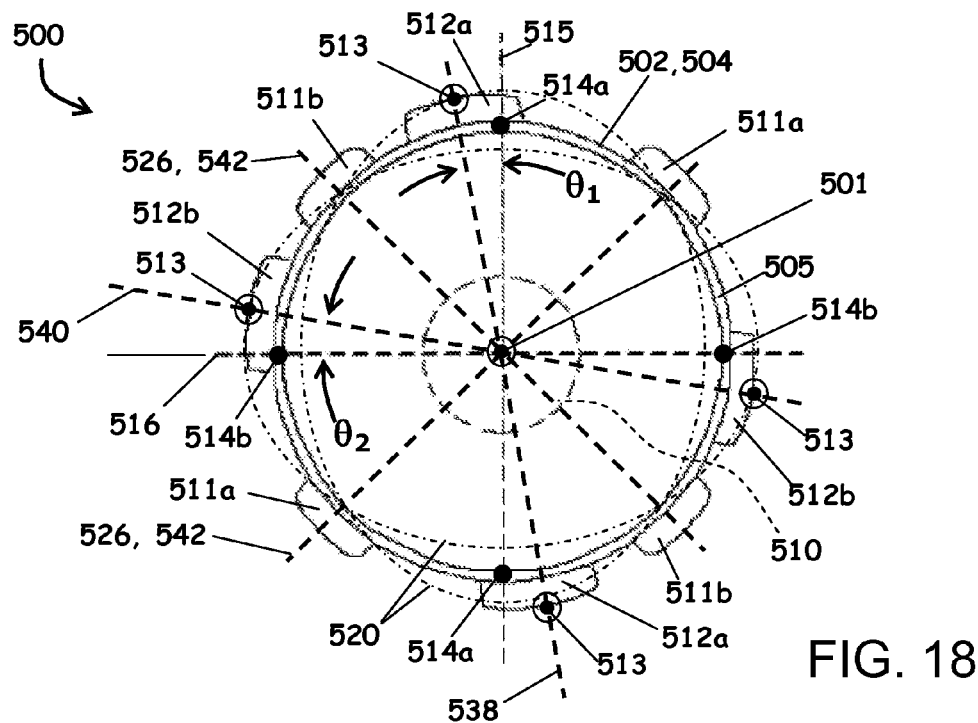
FIG. 18 illustrates a top view of the cup assembly of FIGS. 16 and 17.

Referring to FIGS. 16 through 18, another embodiment of the invention implements the skewing principle by applying a skew angle to the drive element pairs instead of the sense element pairs, and operates to change the position of the oscillatory nodes. A vibratory cup system 500 is depicted including a resonant body 502 that is continuous about a centerline 501 and has an outer surface 504, a proximal end 506 and a distal end 508. A stem 510 depends from the proximal end 506, and the distal end 508 defines a rim 505. Sense element pairs 511a and 511b and two pairs of drive elements 512a and 512b are operatively coupled to the outer surface 504 of the resonant body 502 adjacent the rim 505. Each of the drive elements in the 512a and 512b pairs may be characterized by a central axis 513 that may be parallel to the centerline 501. Likewise, each of the sense element pairs 511a and 511b are characterized by a central axis 517.

As with the skewed sense configuration (FIGS. 2 through 4), the embodiment of FIGS. 16 through 18 generates a four-node vibration pattern 520 that resonates on a resonant body 504, the vibration pattern 520 including the two pairs of anti-nodes 514a and 514b and two pairs of nodes 519a and 519b. The anti-nodes 514a and 514b define a pair of anti-node reference axes 515 and 516, and the nodes 519a and 519b define a pair of node reference axes 526 and 528.

The centroids of the drive element pair 512a define a first drive element axis 538, and the centroids of the drive element pair 512b define a second drive element axis 540. The drive element axes 538 and 540 are rotationally offset from the anti-node reference axes 530 and 532, respectively, by skew angles $\theta_1$ and $\theta_2$. The skew angles $\theta_1$ and $\theta_2$ may be of an equal magnitude but in opposite rotational directions. That is, the skew angle $\theta_2$ of the drive element axis 538 relative to the anti-node reference axis 530 may be negative (clockwise), whereas the skew angle $\theta_1$ of the drive element axis 540 relative to the anti-node reference axis 532 may be positive (counterclockwise).

In the embodiment depicted in FIGS. 16 through 18, the centroids of the sense element pairs 511a and 511b define a pair of sense element axes 542 and 544 that are in rotational alignment with the node reference axes 526 and 528.

In operation, a drive applied only to the element pair 512a on the first drive element axis 538 causes the vibration pattern 520 to rotate counterclockwise by an angle $\theta_1$ relative to the orientation of the vibration pattern 520 shown in FIG. 18, so that the anti-node reference axis 515 aligns rotationally with the first drive element axis 538. On the other hand, if a drive is applied only to the second element pair 512b on drive element axis 540, the vibration pattern 520 is rotated clockwise by an angle $\theta_2$ so that the anti-node reference axis 516 is in rotational alignment with the first drive element axis 540. Thus, the first drive element axis 538 may be said to have an opposite oscillation phase relative to the second drive element axis 540.

In this embodiment, if an equal drive force is applied to both drive element axes 538 and 540, the vibration pattern 520 does not rotate relative to the orientation of the vibration pattern 520 shown in FIG. 18. By this arrangement, the offset angle of the drive oscillation θ can be set to any value between $+\theta_2$ and $-\theta_1$ (where "+" indicates a clockwise rotation when viewing the open end of the cup resonator) by adjusting the ratio of the signals applied to the two pairs of drive elements on the drive element axes 538 and 540.

In both the skewed sense configuration (FIGS. 2 through 4) and the skewed drive configuration (FIGS. 16 through 18), four elements are used to drive the oscillation pattern, which enables higher oscillation amplitudes to be achieved for a higher signal-to-noise ratio and better control of the mode of oscillation. A system that drives the vibration pattern along one axis only is prone to the creation of all even numbered harmonics (fundamental, 2, 4, 6, 8 . . . ). However, a system that is driven along two orthogonal axes, with the axes in opposing phase, is prone to fewer harmonic oscillations (i.e. fundamental, 4, 8, 16 . . . ).

Referring again to FIGS. 16 through 18, the principles outlined above may be applied to rotate the vibration pattern 520 (i.e. the anti-node reference axes 515 and 516 and the node reference axes 526 and 528) by changing the gain ratio for the two drive element pairs 512a and 512b.

The gain ratio adjustment subsystem 480 can be used to adjust the alignment of the anti-node reference axes 515 and 516. The base signal of $S_1$–$S_2$ can be substantially zeroed when the sensor is at rest. Dynamic adjustment may facilitate the damping of displaced driven vibrations, which can be used as a torque mechanism to extend the bandwidth of the gyroscope output or to control quadrature oscillations. Moreover, the foregoing may be accomplished with fewer connections than in the split drive electrode assembly 30 (FIG. 1), thereby enhancing the simplicity and symmetry for better resonance performance.

Certain embodiments have been described above in connection with a cup-type vibrating structure. The principles described herein can be applied to other gyroscope configurations, such as gyroscopes employing ring and plate type vibrating structures. In such implementations, like the cup implementation described herein, the sensing and driving elements, which use capacitive or magnetic sensing and driving, are skewed from the typical orientation by a small angle. The same functions and advantages discussed above may be produced as a result.

Figure 19:
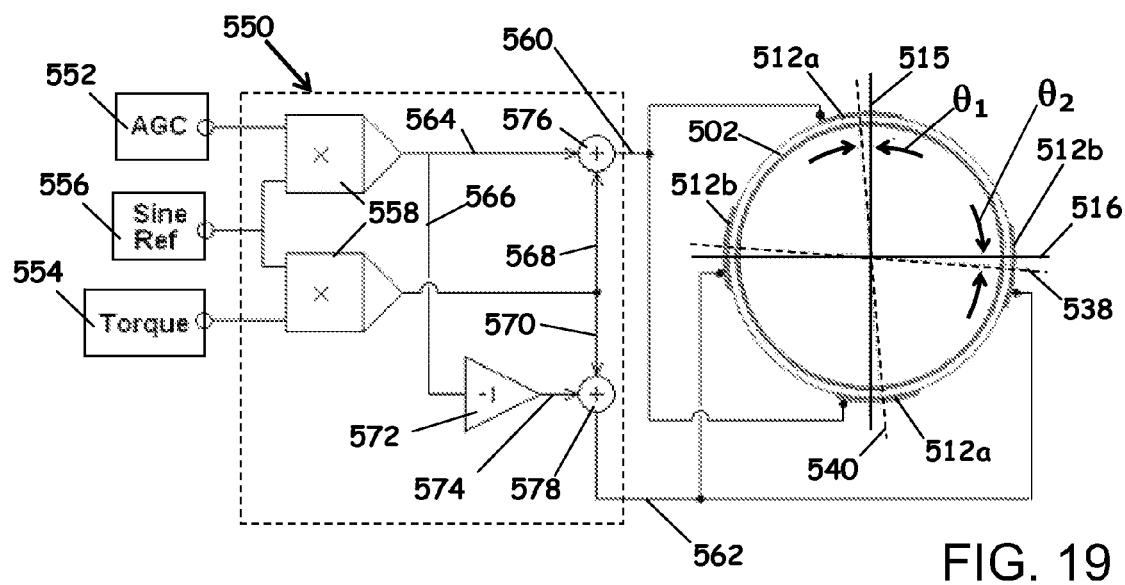
FIG. 19 is an active torque drive circuit according to an embodiment of the present invention.

Referring to FIG. 19, an embodiment of an active torque drive circuit 550 is depicted. The torque drive circuit 550 receives three inputs: an AGC signal 552, a torque signal 554 and a sine reference or drive reference frequency 556. The AGC signal 552 is indicative of the controlled drive voltage applied to the drive element pairs 512a and 512b. The torque signal 554 constitutes the feedback signal received from the sense element pairs 511a and 511b.

The AGC signal 552 and torque signals 554 are routed through separate multipliers 558 that multiply the respective signals by the sine reference 556 to modulate a pair of outputs 560 and 562 of the torque drive circuit 550. The outputs of the multipliers 558 are split so that there are two modulated AGC signals 564 and 566 and two modulated torque signals 568 and 570. One of the split signals (in the FIG. 19 embodiment it is modulated AGC signal 566) is routed through an inverter 572 to produce a modulated inverted AGC signal 574. The modulated AGC signal 564 and the torque signal 568 are routed through a first adder 576, and the inverted modulated AGC signal 574 and the torque signal 570 are routed through a second adder 578 to produce the outputs 560 and 562 of the torque drive circuit 550 that source the drive element pairs 512a and 512b.

The torque drive circuit 550 may be utilized to adjust the drive vibration vector angle proportionate to the torque signal amplitude. The formulations that apply to the FIG. 19 embodiment are as follows:

$$V_{D1} = V_T \sin(\omega t) + V_C \sin(\omega t) \qquad \text{Eqn. (13)}$$

$$V_{D2} = V_T \sin(\omega t) - V_C \sin(\omega t) \qquad \text{Eqn. (14)}$$

where $V_{D1}$ and $V_{D2}$ are the drive signals 560 and 562 applied to drive element pairs 512a and 512b, respectively, $V_C$ is the AGC signal 552, $V_T$ is the torque signal 554, $\omega$ is the drive reference frequency and t is time.

Operationally, if $V_T = 0$ (no torque signal), $V_{D1} = -V_{D2}$ and the vibration pattern 520 will settle at a nominal position that is theoretically equidistant between the $-\theta_1$ and $+\theta_2$ rotational positions when the gyroscope is rotationally at rest. This nominal position is depicted in FIG. 18. That $V_{D1}$ is positive and $-V_{D2}$ is negative indicates that $V_{D1}$ and $V_{D2}$ are of opposite polarity. Because of the orientation of the respective drive axes 538 and 540, there is a large orthogonal component existing between the respective drive axes 538 and 540, and the opposite polarity between $V_{D1}$ and $V_{D2}$ is largely constructive, meaning that both drive element pairs contribute to the overall amplitude of the drive signal. The net effect is that the amplitudes of $V_{D1}$ and $V_{D2}$ are additive. Assuming, for example, a unit signal for $V_C$ (i.e. $V_C = 1$) the amplitudes of $V_{D1}$ and $V_{D2}$ add up to 2. As a practical matter, the signal delivered to drive elements should generally be sufficient to sustain vibration of the resonator.

If $V_T = V_C$ and assuming again the example where unit signals are applied ($V_T = V_C = 1$), then $V_{D2} = 0$, $V_{D1} = 2$. The system would then be driven substantially along drive element axis 540, causing the anti-node reference axis 515 to rotate the full skew angle $\theta_1$ in a counterclockwise direction from the nominal orientation. Note that while $V_{D2}$ does not contribute to the drive amplitude of the oscillation pattern, $V_{D1}$ is doubled over what it was in the $V_{D1} = -V_{D2}$ case, so that the amplitudes again add up to 2.

Likewise, if $V_T = -V_C = 1$, then $V_{D1} = 0$, $V_{D2} = 2$, and the system is driven along drive element axis 538, causing the anti-node reference axis 516 to rotate the full skew angle $\theta_2$ in a clockwise direction from the nominal orientation. In this scenario, $V_{D1}$ does not contribute to the drive amplitude of the oscillation pattern, but $V_{D2}$ is doubled so that the amplitudes again add up to 2.

The anti-node reference axes 515 and 516 can be shifted electronically to intermediate angular orientations according to a relationship that closely approximates the following:

$$\theta_D = -\tfrac{1}{2}(\theta_2 + \theta_1) \cdot (V_T/V_C) \qquad \text{Eqn. (15a)}$$

where $\theta_D$ is the angular orientation of the drive vector relative to the nominal orientation depicted in FIG. 18. Accordingly, the rotation is generally proportional to the ratio $V_T/V_C$. For embodiments where $\theta_2 = \theta_1 = \theta$, the expression simplifies to $$\theta_D = -\theta \cdot V_T/V_C \qquad \text{Eqn. (15b)}$$

The range of the angular orientation $\theta_D$ is not limited to $-\theta_1 \leq \theta_D \leq +\theta_2$. The orientation $\theta_D$ can be driven beyond the $-\theta_1$ to $+\theta_2$ boundary by applying a torque signal $V_T$ that is greater than the AGC signal $V_C$, just as Eqns. (15a) and (15b) suggest. For example, if $V_T = 1.1 \cdot V_D$, then $V_{D1} = 2.1 \cdot \sin(\omega)$ and $V_{D2} = 0.1 \cdot \sin(\omega)$. The positive coefficients illustrate that $V_{D1}$ and $V_{D2}$ are not cooperative, and thus are largely destructive. However, the signal $V_{D1}$ is dominant, and the result is an amplitude addition that is again equal to 2.

The difference is that the anti-node location is shifted outside the $-\theta_1 \leq \theta_D \leq +\theta_2$ envelope in accordance with Eqn. (15a). For $\theta_2$ and $\theta_1$ magnitudes that are equal and the $V_T/V_C = 1.1$ of the present example, the angular orientation $\theta_D$ is approximated by $-1.1\theta_2$. Similarly, the same shift will occur in the opposite direction if $V_T = -1.1 V_C$, where the negative sign indicates a phase that is opposite to $V_C$.

A functional advantage of the skewed electrode arrangement of FIGS. 16 through 18 over the split drive electrode configuration of FIG. 1 is that the skewed electrode arrangement may be configured to provide a "mirrored symmetry" about any plane that is coincident with the centerline axis 101. Thus, for any arbitrary plane containing the centerline axis 101, regardless of angular orientation, the vibration pattern 120 on one side of the plane propagates through the same number of elements on the other side of the plane, with each of the mirrored elements having the same number of connections. If the elements on one side of the plane are sized to match the elements mirrored on the other side of the plane, and if the connections of the mirrored elements are configured substantially the same, the resonant symmetry of the cup assembly 500 is enhanced. While resonant symmetry is beneficial to any vibrating inertial rate sensor, it is particularly important for gyroscopes having a high mechanical "Q."

Figure 20:
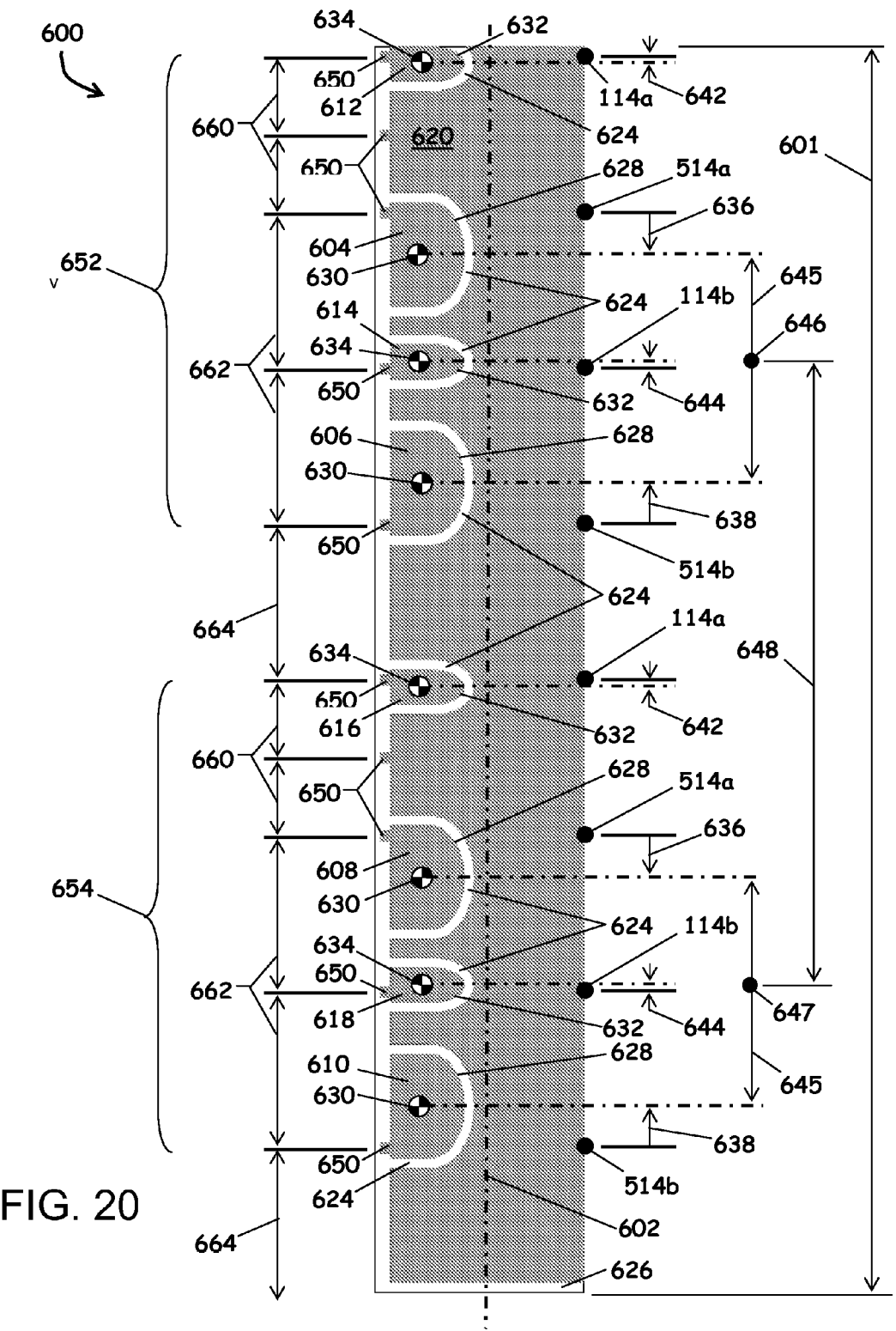
FIG. 20 is a pattern for operational elements having both skewed drive and skewed sense axes in an embodiment of the invention.

Referring to FIG. 20, an operational element pattern 600 for deposit on a cup resonator that combines skewed sense and skewed drive elements is depicted according to an embodiment of the invention. The operational element pattern 600 includes an overall length 601 that defines a lateral axis 602, a plurality of drive elements 604, 606, 608 and 610, a plurality of sense elements 612, 614, 616 and 618, and a ground element 620. Each of the various elements are separated by electrical isolation barriers 624. A longitudinal isolation strip 626 may also be included at either or both ends of the operational element pattern 600. (The lateral axis 602 and longitudinal isolation strip 626 are so-named because of their relationship to the centerlines 101 or 501 of the various cup electrode embodiments.)

The node pairs 114a and 114b of FIGS. 2 and 4 and the anti-node pairs 514a and 514b of FIGS. 16 and 18 are superimposed on the operational element pattern 600. The lateral positioning of the node pairs 114a and 114b and the anti-node pairs 514a and 514b is in accordance with the nominal position of oscillation pattern 520 as depicted in FIG. 18.

The drive elements 604, 606, 608 and 610 are each characterized by a curved boundary 628 and a drive element centroid 630 located at the center of mass of the respective drive element. Likewise, each sense element 612, 614, 616 and 618 is also characterized by a curved upper boundary 632 and a sense element centroid 634. The operational element pattern 600 specific to FIG. 20 is formed so that the drive element centroids 630 of drive elements 604 and 608 are offset relative to anti-node pair 514a by a first drive element offset 636, and the drive element centroids 630 of drive elements 606 and 610 are offset relative to anti-node pair 514b by a second drive element offset 638.

The curved upper boundaries 628 and 632 may be substantially congruent with local stress gradients that occur in the walls of the resonator when vibrating. The advantages of such a design are disclosed in U.S. Pat. No. 6,845,667 to Watson, the disclosure of which is hereby incorporated by reference other than any express definitions of terms specifically defined therein.

The first and second drive element offsets 636 and 638 are parallel to the lateral axis 602, are in directions opposite relative to each other, and may be of equal magnitude. When the operational element pattern 600 is transformed onto a cylindrical coordinate system, the first and second drive element offsets 636 and 638 translate to rotational offsets, such as depicted by skew angles $\theta_1$ and $\theta_2$ in FIG. 18.

The operational element pattern 600 of FIG. 20 is also formed so that the sense element centroids 634 of sense elements 612 and 616 are offset relative to node pair 114a by a first sense element offset 642, and the sense element centroids 630 of sense elements 614 and 618 are offset relative to node pair 114b by a second sense element offset 644. The first and second sense element offsets 642 and 644 are parallel to the lateral axis 602, are in directions opposite relative to each other, and may also be of equal magnitude. When the operational element pattern 600 is transformed onto a cylindrical coordinate system, the first and second drive element offsets 642 and 644 translate to rotational offsets, such as depicted by skew angles $\theta_1$ and $\theta_2$ in FIG. 4.

The operational element pattern 600 may also be characterized as successive pairs of like-functioning operational elements (i.e. drive element pairs or sense element pairs) arranged in a relationship that meets certain criteria. For example, centroids 630 of the drive elements 604 and 606, both located on the upper half of the operational element pattern 600, are separated by a span distance 645. Likewise, the centroids of the drive elements 608 and 610, located on the lower half of the operational element pattern 600, are separated by the same span distance 645. A pair of mid-points 646 and 647 are located equidistant between the centroids 650 of the respective drive element pairs 604, 608 and 606, 610. The mid-points 646 and 647 are spaced apart by a distance 648.

For configurations where the drive element pairs 604, 608 and 606, 610 are in diametric opposition, the span distances 645 will be substantially equal whether the first and second drive element offsets 636 and 638 are equal or not equal. For configurations where the first and second drive element offsets 636 and 638 are substantially equal, the mid-points 646 and 647 will theoretically align with the node pairs 114b, as depicted in FIG. 20. Unequal offsets 636, 638 will cause a misalignment between the mid-points 646, 647 and the node pair 114b.

In FIG. 20, the span distances 645 are less than one-quarter of the overall length 601 in order to affect rotational offsets (e.g. $\theta_1$ and $\theta_2$ of FIG. 18) in an axisymmetric configuration. Rotational offsets may also be affected by span distances 645 that are greater than one-quarter of the overall length 601. However, span distances 645 that are substantially equal one-quarter if the span length do not affect a rotational offset in a continuous body resonator.

In any case, for resonator configurations where the drive element pairs 604, 608 and 606, 610 are in diametric opposition, the distance 648 between mid-spans 646 and 647 is substantially equal to the half of the overall length 601.

Hence, one embodiment of an operational element pattern that affects a combination of diametric opposition between operational element pairs and rotational offsets may be characterized as having two pairs of like-functioning operational elements, one pair having a mid-point centered on a first half of the pattern, another pair having a mid-point centered on a second half of the pattern, with the centroids of the elements of each like-functioning operational element pair being located the same distance apart, that distance being either more or less than one-quarter of the overall length of the pattern. Furthermore, the distance between the mid-points of this embodiment is substantially equal to half of the overall length of the pattern.

The same characteristics apply with respect to placement of the sense elements 612-618, but are not explicitly diagrammed for the sake of maintaining the clarity of FIG. 20.

The particular configuration of FIG. 20 may be directed to operational elements that take the form of electrodes, and may be constructed by numerous methods and techniques available to the artisan. One such method involves screen printing a metal-bearing ink onto a cup resonator and firing the ink to create a conductive layer that is bonded to the resonator. An example of an ink that may be utilized in this process is a silver-bearing ink. The electrical isolation barriers 624 such a design takes the form of a gap in the ink, and is sized to so that ink printing between the drive and sense elements 604-618 do not bridge to the ground element 620. For the ink printing process, the longitudinal isolation strip 636 may be utilized to prevent overlapping of the ink pattern.

Another process for disposing a given operational element pattern on a resonator involves plating a layer over a surface of the resonator and masking the operational and ground elements shapes with an acid-resistant ink. The masking process leaves only the areas of the plating designated as electrical barrier regions (e.g. electrical isolation barriers 624) exposed. The masked surface is then exposed to an acid etching process which removes plating primarily from the unmasked electrical barrier regions. The acid-resistant ink may then be removed using a solvent. The longitudinal isolation strip 636 does not serve the same function in this process as it does in the ink printing process.

The plating material may be of an electrically conductive plating material, such as copper or nickel. The plating process may be of any technique that is compatible with the materials being plated, such as an electroless process.

Operationally, the drive skew may be used to adjust drive alignment or to apply a torquing signal. For the alignment function, the skew angles need only be big enough to overcome the placement errors of the electrodes. If a torquing configuration is desired, then the angle of the skew is controlled by the maximum angular rotation rate of the gyroscope specification. The relationship between skew angle and captured angular rotation rate is governed by many factors, including the resonant frequency and the "Q" of a given gyroscope. An exemplary, non-limiting combination is skew angles of ±12 degrees to accommodate a maximum angular rotation rate of ±2,000 degrees/second.

The sense skew is used to adjust sense alignment for a cup that has torquing or to establish the range of detectable rotation rates for a gyro cup that has no torquing. To perform the sense alignment function, the magnitude of the skew of the sensing axis need only be sufficient to overcome the placement errors of the electrodes. If the skew is used for ranging the detectable rotation rate, the angle of the skew is controlled by the maximum angular rate.

Accordingly, an operational element pattern 600 configured for dynamic torquing of an oscillation pattern (e.g. vibration pattern 520) may be characterized as having first and second drive element offsets 636 and 638 that are larger than first and second. Conversely, an operational element pattern 600 that is not configured for dynamic torquing may have sense element offsets 642 and 644 that are greater than the drive element offsets 636 and 638.

The operational element pattern 600 also includes a plurality of signal contact tabs 650, one for each of the drive, sense and ground elements 604-620. The embodiment depicted in FIG. 20 includes ten signal contact tabs 650 that can be divided into two sets of five, the sets being designated by numerical references 652 and 654. Each set 652 and 654 includes a first separation distance 660 and a second separation distance 662 between adjacent tabs. The two sets of five are separated by a third separation distance 664. In the particular depiction of FIG. 20, the third separation distance 664 is substantially equal to the second separation distance 662, but the general arrangement is not limited in this way.

Functionally, the repeating pattern within and between the two sets 652 and 654 creates a mirrored symmetry about any plane that is coincident with the rotational axis (e.g. coincident with centerline axis 101 or 501 of FIGS. 4 and 18, respectively), thereby providing a resonant symmetry to the gyroscope assembly and the attendant benefits discussed above. To the extent that the various separation distances can be made equal to each other (e.g. the third separation distance 664 made substantially equal to the second separation distance 662, as in FIG. 20), the resonant symmetry of the gyroscope will be enhanced.

Figure 21:
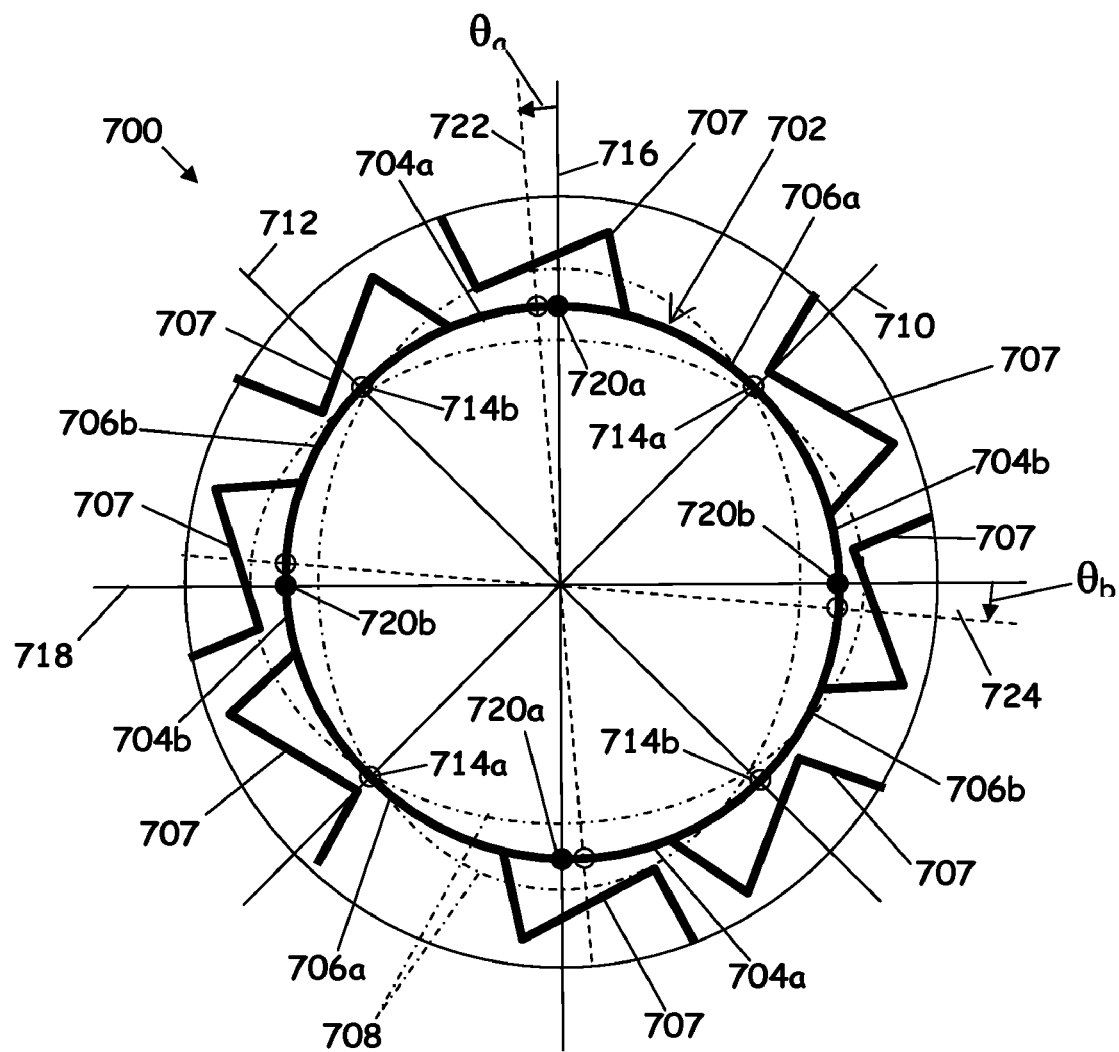
FIG. 21 is a plan view of a ring-type gyroscope illustrating skewed drive elements according to an embodiment of the present invention.

Referring to FIG. 21, for example, an embodiment in which an angular rate sensor is in the form of a ring gyroscope 700 is depicted. The ring gyroscope 700 may operate electromagnetically, piezoelectricly or capacitively. The gyroscope employs a ring 702 on which two pairs of drive elements 704a and 704b and two pairs of sensing elements 706a and 706b are disposed. A plurality of so-called "spider web legs" 707 extend outward from the ring 702. The centers of the drive element pairs 704a and 704b and sensing element pairs 706a and 706b are established as the center of an arc portion of the ring 702 between adjacent spider web legs 707 (indicated by the open circles on the ring 702). A four-node vibration pattern 708 is depicted with node reference axes 710 and 712 that are aligned with two pair of the oscillation nodes 714a and 714b, and anti-node reference axes 716 and 718 that are aligned with two pair of oscillation anti-nodes 720a and 720b.

In the FIG. 21 embodiment, the sensing element pairs 706a and 706b are centered on the node reference axes 710 and 712. (Note that the centers of the drive elements in the sensing element pairs 706a and 706b are aligned with the oscillation nodes 714a and 714b.) However, the drive element pairs 704a and 704b are displaced from the nominal anti-node reference axes 716 and 718 by skew angles $\theta_a$ and $\theta_b$, respectively. The centers of the drive element pairs 704a and 704b define a first and a second drive element axis 722 and 724, respectively.

In operation, if only the drive element pair 704a is activated, the vibration pattern 708 is rotated counterclockwise by the skew angle $\theta_a$. On the other hand, if only the drive element pair 704b is activated, the vibration pattern 708 is rotated clockwise by the skew angle $\theta_b$. Thus, the drive element axis 722 has an opposite oscillation phase relative to drive element axis 724. In theory, if drive amplitudes are applied equally through both drive element pairs 704a and 704b, the oscillation pattern is not rotated from the nominal position depicted in FIG. 21. The offset angle $\theta$ of the drive oscillation can therefore be set to any value between $+\theta_b$ and $-\theta_a$ by adjusting the ratio of the drive amplitudes applied by the two pairs of drive elements on drive element axes 722 and 724. The gain ratio adjustment subsystem 480 of FIG. 15 may be used for this purpose.

Figure 22:
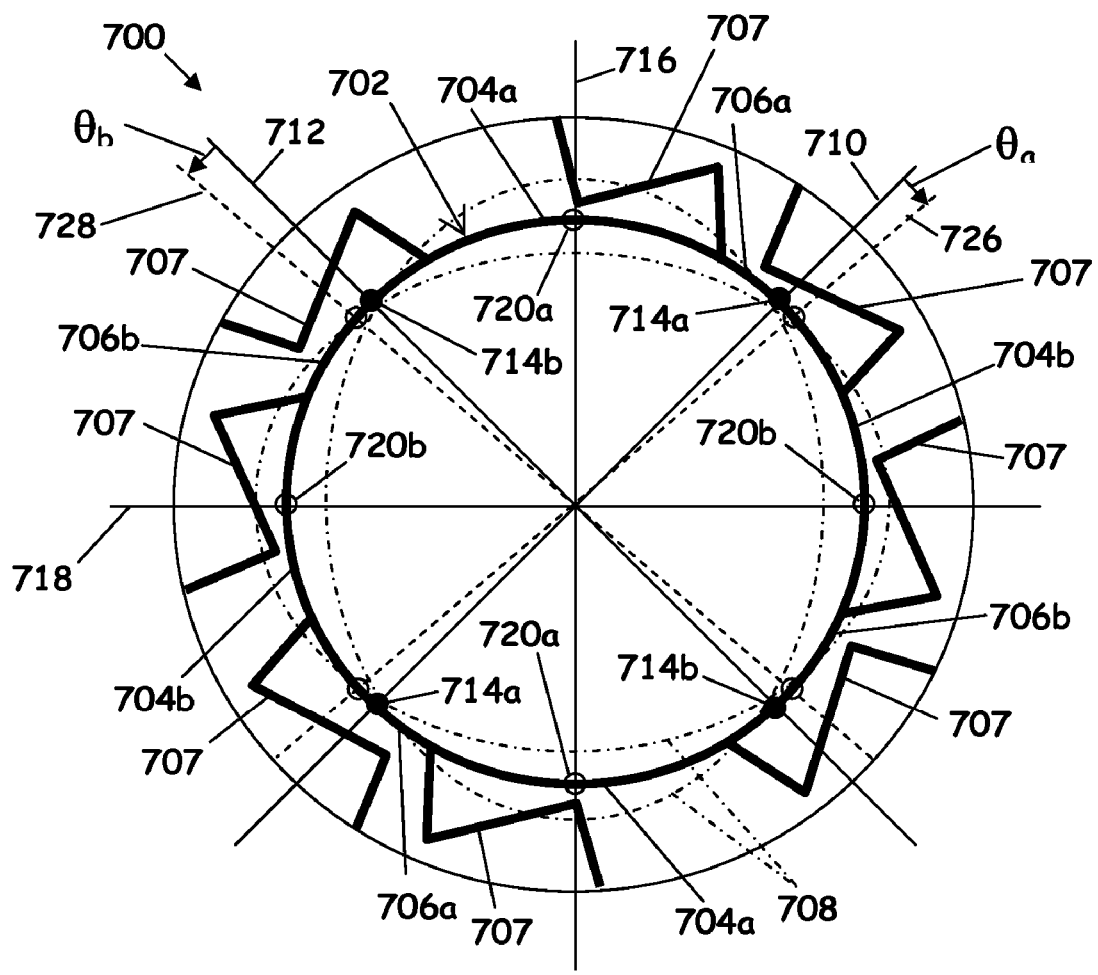
FIG. 22 is a plan view of the ring-type gyroscope of FIG. 14 configured to skew the sensing elements.

Referring to FIG. 22, and as a further example embodiment, the centers of the sensing element pairs 706a and 706b may be displaced with respect to the node reference axes 710 and 712. The FIG. 22 embodiment represents the centers of the drive element pairs 704a and 704b are coincident with the anti-node reference axes 716 and 718. (Note that the centers of the drive elements in the drive element pairs 704a and 704b are aligned with the oscillation anti-nodes 720a and 720b.) But the centers of the diametrically opposed sensing element pair 706a, represented by a sensing axis 726, are displaced by the skew angle $\theta_a$ in the clockwise direction with respect to the respective node reference axes 710. To affect the opposite oscillation phase, the centers of the alternate sensing elements 706b, represented by a sensing axis 728, are displaced by the skew angle $\theta_b$ in the counterclockwise direction with respect to the node reference axes 716. The signal produced by each of the sensing element pairs 706a and 706b is proportional to the vibration amplitude at its location. The derivation of the mathematical equations leading to the summation and the subtraction of element signals to determine the drive sensing and the rate sensing signals is the same as with the resonant body 502 presented in Eqns. (1) through (4).

The silicon ring-type gyroscope illustrated in FIGS. 21 and 22 may offer a number of advantages relative to some conventional ring-type gyroscope designs. For instance, drive sensing and rate sensing functions can be implemented using the same sensing elements 706. In the embodiment represented in FIGS. 21 and 22, the AGC circuit can be used to correct drift of the drive biases of the gyroscope associated with aging. The characteristics of the drive sensing and rotation rate sensing functions do not vary substantially with respect to each other because these functions are implemented using the same components, with sensing elements 706 fabricated from the same type of material and using the same joining techniques.

Certain principles discussed above can be applied to other vibrating gyroscope configurations such as tuning fork type gyroscopes and plate type gyroscopes, discussed below. However, the skewed drive embodiments are applicable only in systems having more than one node. Two or more nodes enable the redirected drive energy of one node to be compensated by an equal and opposite action at the other node. Nevertheless, the principles of the skewed sense configuration are applicable to gyroscopes having only one node, such as a tuning fork gyro.

Figure 23:
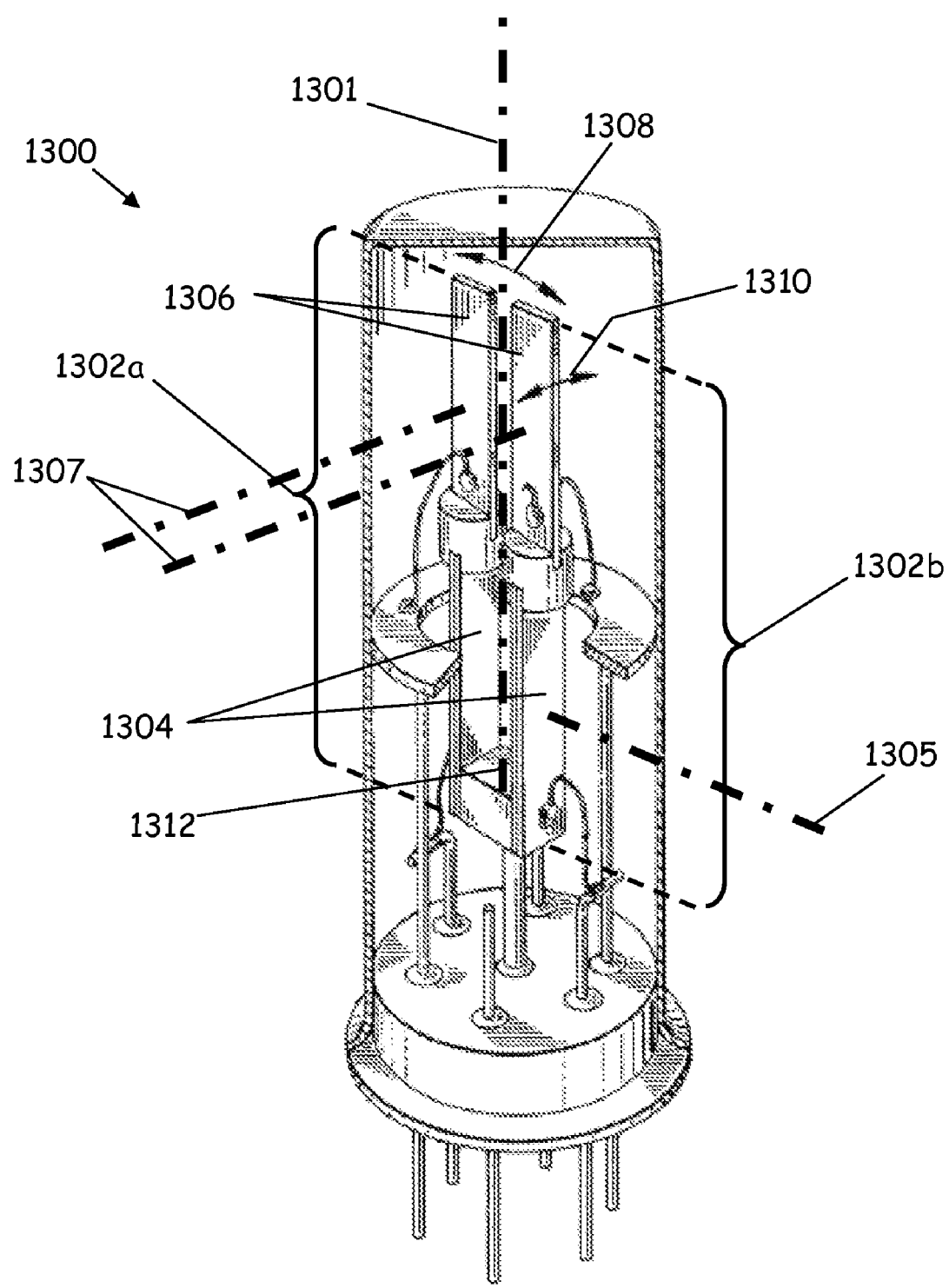
FIG. 23 illustrates a tuning fork type gyroscope.
Figure 24:
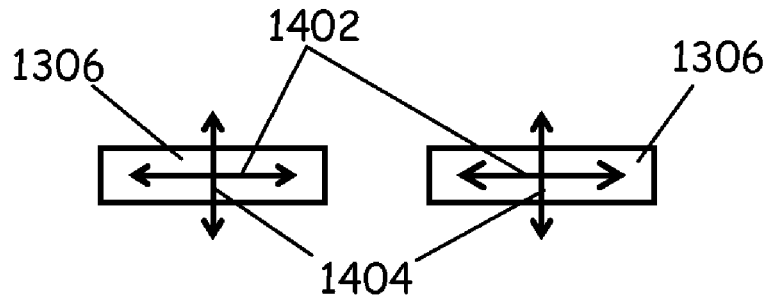
FIG. 24 is a cross-sectional view of a pair of sense elements of the tuning fork gyroscope of FIG. 16.

Referring to FIGS. 23 and 24, a gyroscope 1300 having a tuning fork-like arrangement about a rotation sensing axis 1301 is illustrated. The resonant frequency of the driven fork oscillations and the rate sensing response are substantially the same. The gyroscope 1300 has tines 1302a and 1302b, each comprised of a drive element 1304 having a drive axis 1305 and a sense element 1306 having a sensing axis 1307 perpendicular to the major faces of the sense element 1306. The drive elements 1304 are excited in such a way that causes tines 1302a and 1302b to oscillate in the direction indicated by vector 1308. When the gyroscope 1300 is rotated about the sensing axis 1301, the sense elements 1306 flex in the direction indicated by vector 1310, generating a voltage signal amplitude proportional to the angular velocity of the gyroscope 1300 about the rotation sensing axis 1301. However, the oscillation of the tines 1302a and 1302b in the direction of vector 1308 also imparts some degree of flexure to the sense elements 1306 in the direction of vector 1310. In some cases, this small amount of flexure may be sufficient to cause the piezoelectric materials from which the sense elements 1306 are formed to produce a small voltage signal that erroneously indicates that the gyroscope 1300 is rotating, even when it is not. Further, this small voltage signal introduces a margin of error when the gyroscope 1300 is rotating, potentially causing the gyroscope 1300 to indicate an erroneous angular velocity.

When the tines 1302a and 1302b (FIG. 23) are driven by an AC voltage, they resonate in opposition as illustrated by vectors 1402. The sense elements 1306 respond to rotation rate oscillation vectors 1404 that theoretically respond only to the rotation rate of the gyroscope 1300 because the rotation rate oscillation vectors 1404 are normal to the resonant vectors 1402.

Figure 25:
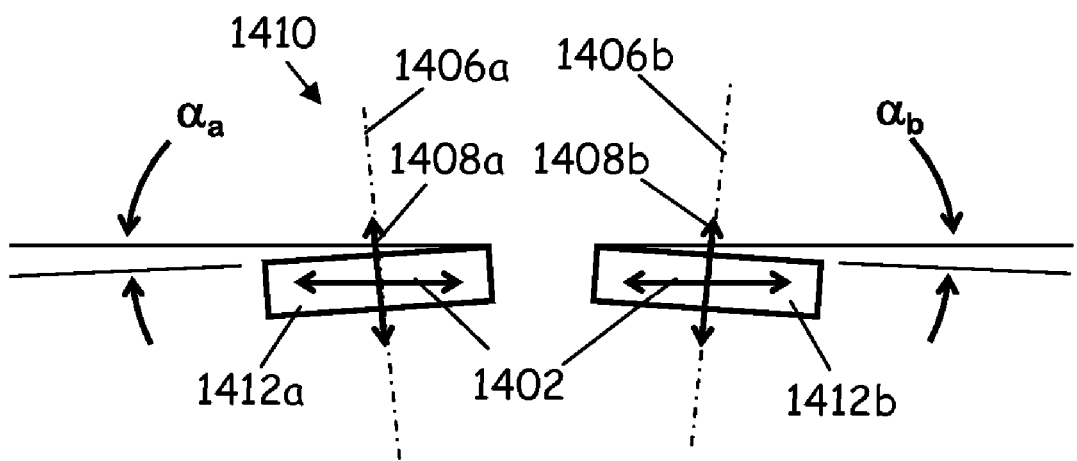
FIG. 25 is a cross-sectional view of a pair of skewed sensing elements for a tuning fork gyroscope according to an embodiment of the present invention.

Referring to FIG. 25, a configuration 1410 utilizing a pair of skewed sense elements 1412a and 1412b to replace the planar sense elements 1306 in vibrating fork gyroscope 1300 is depicted in accordance with one embodiment of the present invention. Because the tuning fork gyroscope 1300 has only one node at a base 1312 (FIG. 23), application of the skew principle takes on a different configuration than disclosed for polar geometries. The sense elements 1412a and 1412b are skewed at angles $\alpha_a$ and $\alpha_b$, respectively, as depicted in FIG. 25, without any skew on the drive elements 1304 (FIG. 23), and the drive vectors 1402 remain in opposition. However, the skew angles $\alpha_a$ and $\alpha_b$ cause the sense elements 1412a and 1412b to be oriented according to a pair of sensing axes 1406a and 1406b, respectively. Accordingly, the sense elements 1406a and 1406b sense a response vector 1408a and 1408b, respectively, comprised of a portion of the drive vector 1402 and a portion of the rotation rate oscillation vector 1404. That is, because the sense axes 1406a and 1406b of the sense elements 1406a and 1406b are not orthogonal to the drive vector 1402, the sense elements 1406a and 1406b detect the response vectors 1408a and 1408b having components from both the drive vector 1402 and the rotation rate oscillation vectors 1404.

The portion of the drive vector 1402 sensed along axes 1406a and 1406b is substantially proportional to $\sin(\alpha_a)$ and $\sin(\alpha_b)$, respectively. Also, sense axes 1406a and 1406b are oriented so the component of the respective response vectors 1408a and 1408b attributed to the drive vectors 1402 are in opposite directions.

Despite the differences in the geometric configurations, the mathematical derivations are similar to the derivations for the ring and cup geometries, as described in connection with Eqns. (1) and (2). Specifically:

$$S_1 = D \sin(\alpha_1) + DK \qquad \text{Eqn. (16)}$$

$$S_2 = D \sin(\alpha_2) - DK \qquad \text{Eqn. (17)}$$

where: $S_1$ is the signal from the first sense element 1412a; $S_2$ is the signal from the second sense element 1412b; D is the driven oscillation signal as would be sensed at the point of maximum oscillation (i.e. at the drive axis 1305); and DK is the signal corresponding to an angular rate of change about the rotation sensing axis 1301. Subtracting the second element signal from the first element signal gives a maximum rate signal and cancels the drive sensing signal:

$$S_1 \cdot \sin(2\alpha_b) - S_2 \cdot \sin(2\alpha_a) = DK \cdot [\sin(2\alpha_a) + \sin(2\alpha_b)] \qquad \text{Eqn. (18a)}$$

Gain adjustment may be used to correct this balance for sensor variations. Adding the first and second element signals gives a maximum drive sensing signal and cancels the rate signal:

$$S_1 + S_2 = D \cdot [\sin(2\alpha_a) + \sin(2\alpha_b)] \qquad \text{Eqn. (19a)}$$

For embodiments where the skew angles are substantially equal ($\alpha_a = \alpha_b = \alpha$), the equations simplify to $$S_1 - S_2 = 2DK \qquad \text{Eqn. (18b)}$$

$$S_1 + S_2 = 2D \sin(\alpha) \qquad \text{Eqn. (19b)}$$

Figure 26:
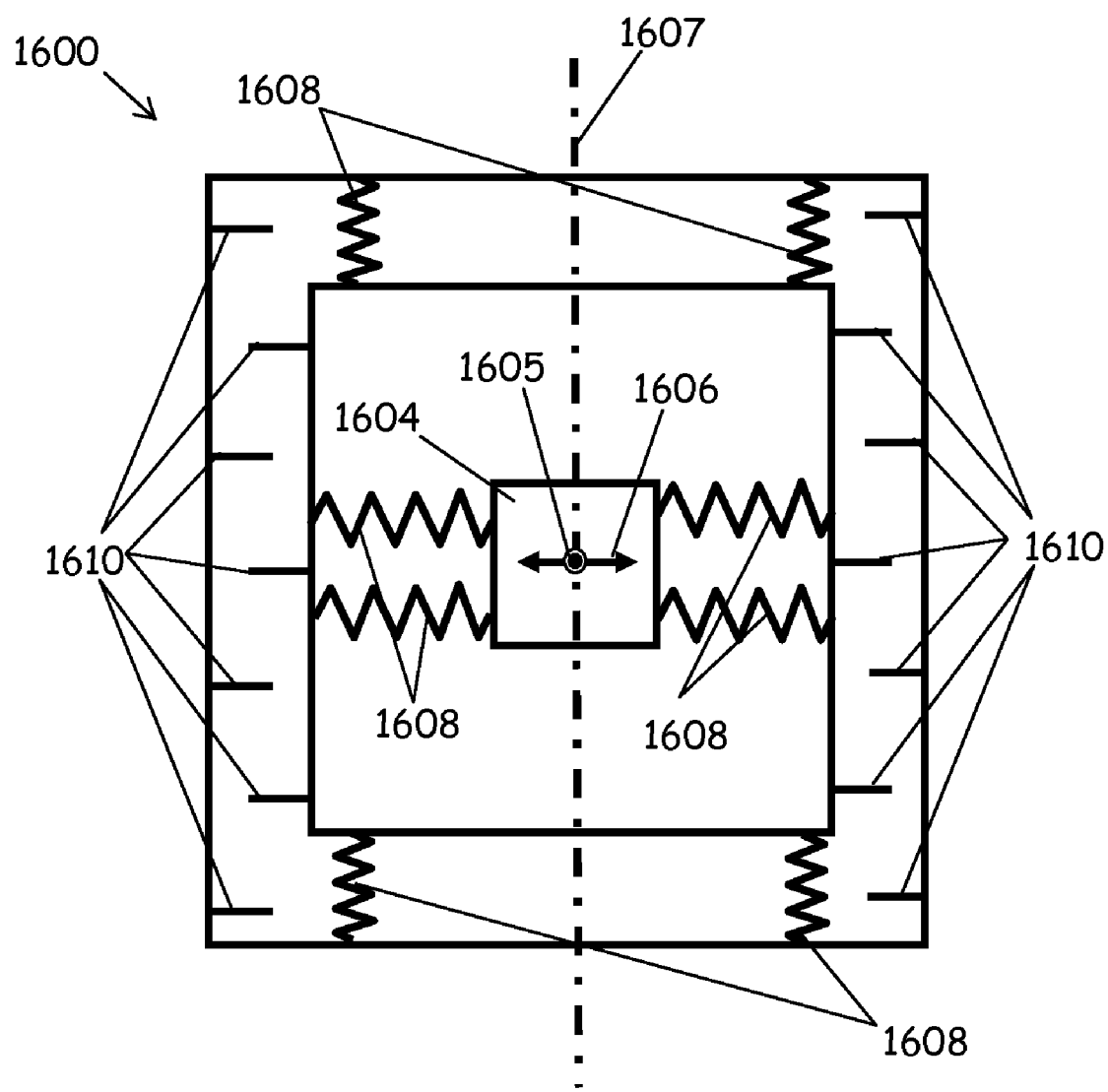
FIG. 26 is a schematic of a plate gyroscope.

Referring to FIG. 26, an element 1600 of a gyroscope configuration known as a plate gyroscope is schematically depicted. The resonant frequency of the driven plate oscillations and the rate sensing response are substantially the same. The plate gyroscope element 1600 is a planar micro-electromechanical system (MEMS) gyroscope that includes an inner frame 1602 and a resonating mass 1604 that may be driven in the direction indicated by a vector 1606 perpendicular to a sense axis 1607. The rotation rate input axis 1605 is substantially at the center of the resonating mass and is substantially orthogonal to both the vector 1606 and the sense axis 1607 (i.e. perpendicular to the plane of FIG. 26). The plate gyroscope element 1600 includes spring elements 1608 and may also include a plurality of Coriolis sense fingers 1610.

Figure 27:
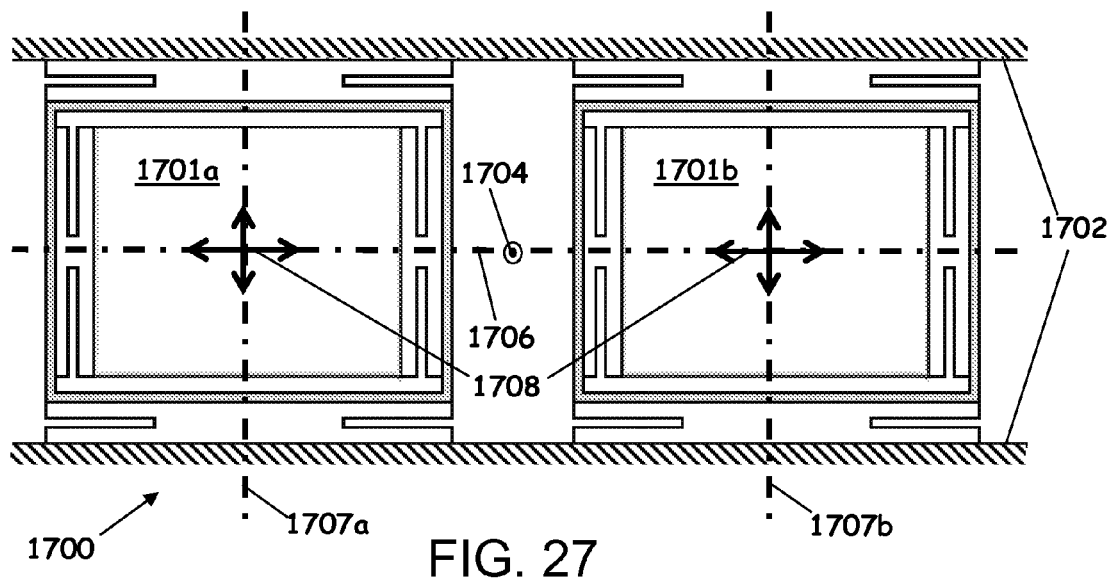
FIG. 27 illustrates a plan view of a pair of plates in a plate type gyroscope.

Referring to FIG. 27, an operational plate gyroscope 1700 comprising two plate elements 1701a and 1701b that embody the operational characteristics of the schematically depicted plate gyroscope element 1700 is portrayed. The operating principles of the plate gyroscope 1700 depicted in FIG. 27 are similar to the tuning fork gyroscope 1300 of FIGS. 23 and 24. Typically, the plate elements 1701a and 1701b are supported by a framework 1702 define a pair of sensing axes 1707a and 1707b that are substantially parallel. The two plate elements 1701a and 1701b vibrate in opposition to each other, similar to the tines 1302a and 1302b of the tuning fork gyroscope 1300 described in connection with FIGS. 23 through 25, and are sensitive to rotation about a rotation rate sensing axis 1704.

The two plate elements 1700a and 1700b are driven along a common drive axis 1706 in linear opposition as illustrated by a pair of drive vectors 1708. In this implementation, the drive mechanism is typically electrostatic attraction and repulsion rather than piezoelectric effects. In the FIG. 27 configuration, the sensing axes 1707a and 1707b are made as orthogonal as possible to the drive axis 1706 to provide the purest rate-sensing signal possible. However, by sensing only the rotation rate, the FIG. 27 configuration requires a separate drive sensing mechanism independent from the rate sensing system.

Figure 28:
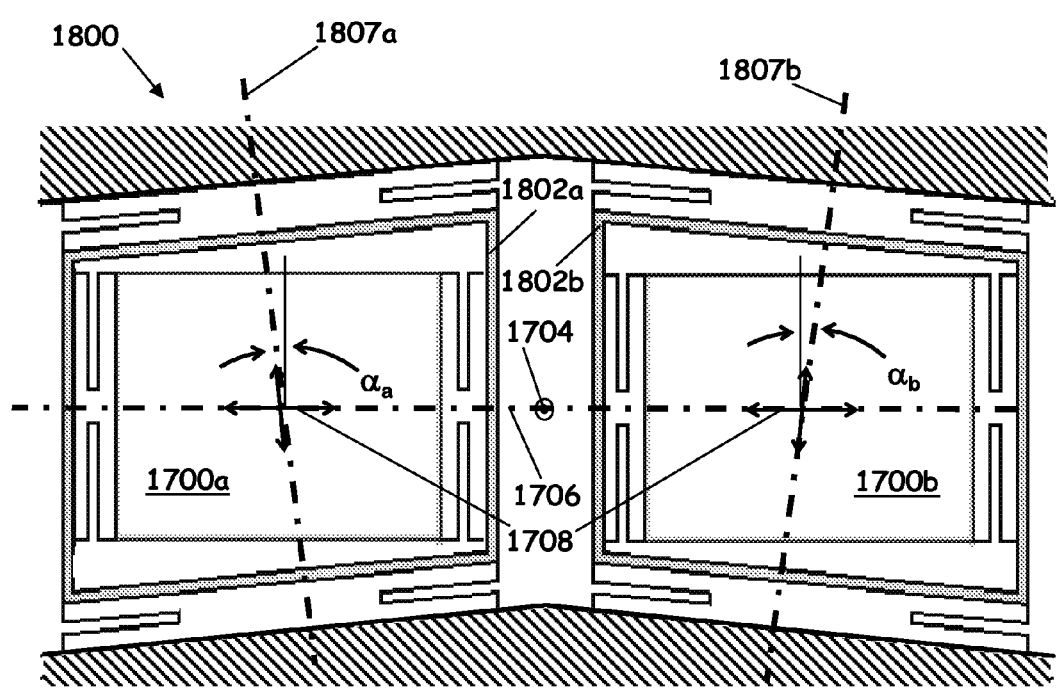
FIG. 28 illustrates a plan view of a skewed plate type gyroscope according to an embodiment of the present invention.

Referring to FIG. 28, an embodiment of a skewed plate gyroscope 1800 according to the present invention is depicted. As in the FIG. 28 configuration, the plate elements 1700a and 1700b are in a parallel arrangement, having the common drive axis 1706 to produce the drive vectors 1708 in linear opposition. (Alternatively, the plate elements need not share a common drive axis 1706, but may have drive axes that are merely parallel to each other.) However, translational frames 1802a and 1802b may be skewed at a slight angles $\alpha_a$ and $\alpha_b$, causing a pair of sensing axes 1807a and 1807b to also be skewed at the respective skew angles. Like the skewed fork arrangement of FIG. 25, the sensing elements of the skewed plate gyroscope detect both a drive component and a sense component.

Functionally, the coincident or parallel arrangement of the drive axes 1706 cause the drive vectors 1708 to remain in opposition; however, the sensing axes 1807a and 1807b are not orthogonal to the drive axes 1706 and sense a portion of the drive oscillation in addition to the signal from rotation rates, thereby producing both a rate sensing and a drive sensing capability as described in Eqns. (16) through (19).

The optimization of the skew angles α and θ for the various embodiments described herein may be calculated from the operational parameters that characterize the system, specifically the precession constant, the maximum rate change and the bandwidth of the system. One principle in determining an optimum skew angle α or θ is that less skew may prevent the drive sense signal from overpowering the rate signal. As a target, the rate signal should equal the drive sense signal at the rated full scale angular rate to be measured. More generally, the drive sense signal and the maximum rate sense signal should not differ by more than an order of magnitude. That is:

$$0.1 \leq D \cdot \sin(\alpha)/DK \leq 10 \qquad \text{Eqn. (20)}$$

The rate signal vibrations spatially lag the driven vibrations because the sense signals are attenuated according to the quality factor Q of the resonant system. The time constant τ of the sense system is hereby defined as the time it takes the amplitude of these vibrations to dampen to 1/e (or approximately 37%) of the initial amplitude. The time constant τ is proportional to the inverse of the bandwidth of the gyroscope mechanism. A reasonable sensing skew angle Ss may be taken as the amount of rotation that occurs in one time constant. An equation for an operative sensing skew angle $S_S$ is then:

$$S_S = \gamma M_R/(2\pi B_W) \qquad \text{Eqn. (21)}$$

where $S_S$ is the operative sensing skew angle in degrees, γ is the precession constant, $M_R$ is the maximum rate change in degrees per second, and $B_W$ is the bandwidth of the gyroscope output response in Hertz. For example, if the precession constant is 1, the gyroscope output bandwidth is 100 Hz and the maximum expected angular rate is 200 degrees per second, then the target skew angle is 0.32°. This value is independent of the number of nodes and the resonance frequency. The skew angle may be increased to discernable level if the operative sensing skew angle $S_S$ is smaller than the dimensional tolerances of construction.

A desired drive skew angle $S_D$ for the adjustment of torque compatible geometries (e.g. cup and ring gyroscopes) can be calculated based on the same principles as for the sense skew $S_S$ described in connection with Eqn. (21). An additional consideration is to provide enough range in the skew angle θ so as not to require too much drive voltage from the system to affect the torque operation. Excessive signals applied to the drive elements may saturate the system resulting in errors. Generally, having a drive skew angle $S_D$ that is about twice the maximum rated sense skew $S_S$ may provide sufficient over ranging. Accordingly, an equation for an operative drive torquing skew angle $S_D$ is:

$$S_D = 2\gamma M_R/(2\pi B_W); \text{ or}$$

$$S_D = \gamma M_R/(\pi B_W) \qquad \text{Eqn. (22)}$$

where $S_D$ is the drive torquing skew angle in degrees, γ is the precession constant, $M_R$ is the maximum rate range in degrees per second, and $B_W$ is the bandwidth of the gyroscope output response in Hertz. For example, if the gyroscope output bandwidth is 100 Hz and the maximum expected angular rate is 200 degrees per second, then the target drive skew angle is 0.64°. As it was for the rate sensing, this value is independent of the number of nodes or the resonance frequency. The drive skew angle $S_D$ may be increased to discernable level if the angle $S_D$ is smaller than construction tolerances can resolve.

A desired drive alignment skew angle $S_A$ for establishing the offset of the drive element axes (e.g. numerical references 538 and 540 of FIG. 16) for cup and ring gyroscopes may be calculated in the same way as the torquing drive skew $S_D$ of Eqn. (22). However, it may be desirable to have the alignment skew angle exceed minimum construction tolerances by a factor of two or three to provide a meaningful over range. Accordingly, an equation for the operative drive skew angle, then, is:

$$S_A = 3D_A \qquad \text{Eqn. (23)}$$

where $S_A$ is the drive alignment skew angle in degrees and $D_A$ is the drive alignment tolerance in degrees. For example, if the gyroscope drive alignment tolerance is 0.5°, then the targeted drive alignment skew angle is 1.5°. Therefore, the larger result from Eqn. (21) or Eqn. (22) may be used for the drive alignment skew angle.

The foregoing descriptions present numerous specific details that provide a thorough understanding of various embodiments of the present invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention.

For example, the material used in the cup may be of a non-homogeneous type instead of the homogeneous piezoceramic as described herein. Those skilled in the art recognize that the methods of manufacture of the components that comprise the cup are numerous and are typically chosen based upon the type of materials or orientation that is required for each application. It is further contemplated that the various resonators need not be integrally formed, but could, for example, comprise a drive resonator portion formed separately from a sensing resonator portion, and the two portions made to communicate vibrationally across an interface or via members interposed therebetween._In addition, although the embodiments described herein are directed to vibrating actuator mass sensor systems, it will be appreciated by those skilled in the art that the teachings disclosed herein can be applied to other systems, such as various drive control systems, ultrasonics, and power converters, without departing from the scope and spirit of the present invention, which is defined solely by the claims that follow.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

What is claimed is:

1. A vibratory inertial rate sensor comprising
a vibratory resonator comprising a continuous body that forms a closed loop on a cross-section that is orthogonal to a centerline axis;
a plurality of operational element pairs operatively coupled to said continuous body, the operational elements of each of said operational element pairs each defining a centroid and being in diametric opposition about said centerline axis to define a plurality of operational element axes, said centroids of said plurality of operational element pairs being arranged in a non-uniform angular distribution about said centerline axis, said non-uniform angular distribution characterized by a mirrored symmetry about any plane inclusive of said centerline axis.

2. The vibratory inertial rate sensor of claim 1 wherein said continuous body is an axisymmetric body being symmetrical about said centerline axis.

3. The vibratory inertial rate sensor of claim 1 wherein a number of said operational element pairs are drive element pairs that generate an oscillation pattern on said vibratory resonator.

4. The vibratory inertial rate sensor of claim 3 wherein said drive element pairs are arranged in said non-uniform angular distribution about said centerline axis to enable dynamic rotation of said oscillation pattern relative to said centerline axis with said drive elements.

5. An inertial sensor for sensing a rate of angular rotation, comprising:
a vibratory resonator comprising a continuous body having a centerline axis;
means for generating an oscillation pattern on said vibratory resonator, said oscillation pattern defining a plurality of node pairs and anti-node pairs, each being positioned about said centerline axis, said plurality of node pairs and anti-node pairs defining a plurality of reference axes, each passing through a corresponding one of said plurality of node pairs and anti-node pairs;
a plurality of operational elements operatively coupled with said continuous body and defining a plurality of operational element axes, each of said plurality of operational element axes passing through a corresponding one of said plurality of operational elements and intersecting said centerline axis,
wherein a first of said operational element axes is offset by a first rotational offset relative to one of said plurality of reference axes, said first of said operational element axes being other than coincident with any of said plurality of reference axes, and a second of said operational element axes is offset by a second rotational offset from said one of said plurality of reference axes, said second rotational offset being in a direction opposite from said first rotational offset.

6. The inertial sensor of claim 5 wherein said first rotational offset and said second rotational offset are of substantially equal magnitude.

7. The inertial sensor of claim 5 wherein said continuous body is axisymmetric.

8. The inertial sensor of claim 5 wherein at least some of said plurality of operational elements are in physical contact with a surface of said continuous body.

9. The inertial sensor of claim 8 wherein said physical contact is selected from the group consisting of a bonded join, a glued joint and a combination thereof.

10. The inertial sensor of claim 5 wherein said first of said operational elements and said second of said operational elements are sense elements.

11. The inertial sensor of claim 5 wherein said plurality of reference axes define a substantially uniform angular displacement between adjacent reference axes of said plurality of reference axes and said first rotational offset is less than half of said substantially uniform angular displacement.

12. The inertial sensor of claim 5 wherein at least one of said operational element axes passes through an additional corresponding one of said plurality of operational elements, said corresponding one and said additional corresponding one of said plurality of operational elements defining an operational element pair.

13. A method of measuring the drive oscillation amplitude and the rotation rate of a vibrating gyroscope comprising:
selecting a vibrating gyroscope having:
a first sensing element configured to sense a first vibration vector having a first drive oscillation component and a first rotational rate component,
a second sensing element configured to sense a second vibration vector having a second drive oscillation component and a second rotational rate component, said second drive oscillation component being of opposite oscillation phase relative to said first drive oscillation component;
obtaining a first signal from said first sensing element and a second signal from said second sensing element;
determining said magnitude of said drive oscillation by performing at least one operation selected from the group consisting of a subtraction of said first and second signals and an addition of said first and second signals; and
determining a rotation rate of said vibrating gyroscope by performing an operation selected from the group consisting of an addition of said first and second signals and a subtraction of said first and second signals.

14. The method of claim 13 further comprising
determining said magnitude of said drive oscillation by multiplying said first signal by a constant; and
determining said rotation rate of said vibrating gyroscope by multiplying said first signal by said constant.

15. An inertial sensor for sensing a rate of angular rotation, comprising:
a vibratory resonator;
at least one drive element operatively coupled with said vibratory resonator to create a vibration on at least a portion of said vibratory resonator;
a first sensing element operatively coupled with said resonator to sense a first vector of said vibration, said first vector including a first drive component; and
a second sensing element operatively coupled with said resonator to sense a second vector of said vibration, said second vector including a second drive component, said second drive component being of opposite oscillation phase relative to said first drive oscillation component.

16. The inertial sensor of claim 15 wherein said vibratory resonator is continuous.

17. The inertial sensor of claim 15 wherein said first drive component and said second drive component are of substantially equal magnitude.

18. An inertial sensor for sensing a rate of angular rotation, comprising:
a vibratory resonator continuous about a centerline axis;
means for generating an oscillation pattern on said vibratory resonator, said oscillation pattern defining a plurality of nodes; and
at least one pair of sensing elements operatively coupled with said vibratory resonator, each of said at least one pair of sensing elements being adjacent to a single one of said plurality of nodes, said single one of said plurality of nodes being positioned between said at least one pair of sensing elements when said vibratory resonator is rotationally stationary.

19. The inertial sensor of claim 18 wherein said vibratory resonator is axisymmetric.

20. An inertial sensor for sensing a rate of angular rotation, comprising:
- a vibratory resonator;
- means for driving an oscillation pattern on said vibratory resonator, said oscillation pattern characterized by at least one anti-node, said at least one anti-node having an oscillation amplitude; and
- means for determining a rotation rate of said vibratory resonator; and
- means for determining said oscillation amplitude of said at least one anti-node.

21. The inertial rate sensor of claim 20 wherein a plurality of sensing elements are shared in said means for determining said rotation rate and said means for determining said oscillation amplitude 22. An inertial sensor for sensing a rate of angular rotation, comprising:
- a continuous vibratory resonator having a plurality of drive elements coupled thereto;
- means for generating an oscillation pattern on said continuous vibratory resonator; and
- means for selectively dynamically rotationally displacing said oscillation pattern,
- wherein each of said means for generating said oscillation pattern and said means for selectively dynamically rotationally displacing said oscillation pattern utilize the same the same of said plurality of drive elements.

23. An inertial rate sensor having a pattern of operational elements comprising:
- a pattern length defining a pattern axis and being divisible into a first half and a second half; and
- at least a first and a second pair of operational elements, all of said operational elements being one of a drive element and a sense element, each operational element having a centroid,
- said centroids of said first pair of operational elements being located on said first half of said pattern length and presenting a first span length between said centroids of said first pair of operational elements when measured parallel to said pattern axis, said centroids of said first pair defining a first midpoint located equidistant therebetween,
- said centroids of said second pair of operational elements being located on said second half of said pattern length and presenting a second span length between said centroids of said second pair of operational elements when measured parallel to said pattern axis, said centroids of said second pair defining a second midpoint located equidistant therebetween,
- said first and second midpoints being separated by a distance substantially equal to one-half of said pattern length,
- said first span length being substantially equal to said second span length and being substantially unequal to one quarter of said pattern length.

24. The inertial rate sensor of claim 23 wherein said pattern length is continuous.

25. The inertial rate sensor of claim 23 further comprising a plurality of signal contact tabs defining a series of spacings on said first half that is repeated on said second half.

26. The inertial rate sensor of claim 25 wherein at least one of said signal contact tabs is in electrical communication with a ground element.

27. A method of making an inertial rate sensor comprising:
- selecting an arrangement having an overall length divisible into a first half and a second half and including at least two pairs of like-functioning operational element patterns, said like-functioning operational element patterns being selected from the group consisting of drive element patterns and sense element patterns, one pair having a midpoint located on said first half of said pattern, another pair having a midpoint centered on said second half of said arrangement, said midpoints presenting a distance therebetween that is substantially equal to half of said overall length of said arrangement, each like-functioning operational element pattern having a centroid, said centroids of each like-functioning operational element pattern pair being located a same distance apart, said same distance being substantially unequal to one-quarter of said overall length of said pattern;
- transferring said pattern to a continuous resonator; and
- converting said like-functioning operational element patterns into like-functioning operational elements.

28. The method of claim 27 wherein converting said like-functioning operational element patterns into like-functioning operational elements includes electrically isolating said like-functioning operational elements.

29. The method of claim 28 wherein converting said like-functioning operational element patterns into like-functioning operational elements includes converting said patterns into a conductive layer that is bonded to said continuous resonator.

30. A method of electrically interfacing with an inertial sensor that includes a vibratory resonator having an axis of symmetry and a plurality of operational elements situated about said axis of symmetry, the method comprising:
- applying a first oscillation drive signal to a first set of at least one operational element and applying a second oscillation drive signal to a second set of at least one operational element that is different from said first set such that at least one of said first and second oscillation drive signals causes said vibratory resonator to vibrate in a vibration pattern about said axis of symmetry, said vibration pattern including a plurality of nodes situated in a first position in relation to said vibratory resonator; and
- changing said vibration pattern such that said plurality of nodes are situated in a second position in relation to said vibratory resonator that is different from said first position by varying an amplitude of at least one of said first oscillation drive signal and said second oscillation drive signal.

31. The method of claim 30, wherein said varying of said amplitude of said at least one of said first oscillation drive signal and said second oscillation drive signal produces a rotational offset in said vibration pattern relative to said axis of symmetry.

32. The method of claim 30, wherein said varying of said amplitude of said at least one of said first oscillation drive signal and said second oscillation drive signal includes setting respective amplitudes of said first oscillation drive signal and said second oscillation drive signal such that:
- a first ratio of said respective amplitudes produces a vibration pattern wherein said plurality of nodes are situated in said second position that is offset from said first position in a first direction by an amount that is generally proportional to said first ratio; and
- an inverse of said first ratio of said respective amplitudes produces a vibration pattern wherein said plurality of nodes are situated in a third position that is offset from said first position in a direction that is opposite said first direction by an amount that is generally proportional to said first ratio.

33. The method of claim 30, wherein said applying of said first oscillation drive signal to said first set of at least one operational element includes applying said first oscillation drive signal to a first pair of operational elements situated on said vibratory resonator along a first reference axis that intersects with said axis of symmetry; and wherein said applying of said second oscillation drive signal to said second set of at least one operational element includes applying said second oscillation drive signal to a second pair of operational elements situated on said vibratory resonator along a second reference axis that intersects with said axis of symmetry and is oblique relative to said first axis of symmetry.

34. The method of claim 30, further comprising:

monitoring said vibration pattern using a third set of at least one operational element and a fourth set of at least one operational element, wherein said operational elements of said third and fourth sets each produces a sense signal representing a characteristic of said vibration pattern existing at a location relative to said vibratory resonator that corresponds to a location of that operational element; and wherein when said at least one operational element of said third set produces a sense signal indicative of a node being present a location that corresponds to said location of said at least one operational element of said third set, said at least one operational element of said fourth set produces a sense signal indicative of an absence of a node present at a location that corresponds to said location of said at least one operational element of said fourth set.

35. The method of claim 34, wherein said monitoring of said vibration pattern using said third and said fourth sets includes obtaining a first sense signal that is electrically common to said at least one operational element of said third set, and obtaining a second sense signal that is electrically common to said at least one operational element of said fourth set;

wherein each of said first and said second sense signals includes a first amplitude component representing a rate of angular motion of said inertial sensor and a second amplitude component representing said first and said second oscillation drive signals; and wherein said monitoring of said vibration pattern further includes combining said first and said second sense signals to produce at least one monitor signal selected from the group consisting of: a rate sense signal representing said rate of angular motion, and a drive sense signal representing said first and said second oscillation drive signals.

36. A circuit that electrically interfaces with an inertial sensor that includes a vibratory resonator, the circuit comprising:

an excitation signal generator that applies an excitation signal to said vibratory resonator that causes said vibratory resonator to vibrate in a vibration pattern, said vibration pattern defining at least one anti-node;

a vibration pattern monitor that obtains a first signal indicative of a vibration characteristic of said vibration pattern present at a corresponding first location on said vibratory resonator, and a second signal indicative of a vibration characteristic of said vibration pattern present at a corresponding second location on said vibratory resonator that is different from said first location;

wherein each of said first and said second signals includes a first amplitude component associated with a rate of said angular motion of said inertial sensor, and a second amplitude component associated with said excitation signal, said amplitude components of said first and second signals being of substantially equal magnitude and of opposite phase when said anti-node is aligned with said drive element; and wherein said vibration pattern monitor obtains at least one of said first and said second amplitude components from said first and said second signals.

37. The circuit of claim 36, wherein said vibration pattern monitor produces a rate signal representing said rate of angular motion by combining said first amplitude component of said first signal with said first amplitude component of said second signal inverted in polarity; and wherein said vibration pattern monitor produces a drive sense signal representing said excitation signal by combining said second amplitude component of said first signal with said second amplitude component of said second signal.

38. The circuit of claim 36, wherein said vibration pattern monitor includes signal conditioning circuitry that performs at least one of buffering and weighting of said first and said second signals.

39. The circuit of claim 38, wherein a signal representing said rate of angular motion is obtained via a first adjustable mixer that applies weighting to said first and said second signals such that said second amplitude component is cancelled from each of said first and said second signals; and wherein a signal representing said excitation signal is obtained via a second adjustable mixer that applies weighting to said first and said second signals such that said first amplitude component is cancelled from each of said first and said second signals.

40. The circuit of claim 36, further comprising a control circuit that adjusts an amplitude of said excitation signal based on at least one of (a) and (b) as follows:

(a) a signal based substantially on a combination of said first amplitude component of said first signal and said first amplitude component of said second signal; and (b) a signal based substantially on a combination of said second amplitude component of said first signal and said second amplitude component of said second signal.

41. The circuit of claim 40, wherein said control circuit includes an automatic gain controller that adjusts said excitation signal based on said first amplitude component from said first and said second signal processed as a function of said second amplitude component of said first and said second signal.

42. The circuit of claim 40, wherein said vibration pattern monitor produces a rate signal representing said rate of angular motion based on said first and said second signals;

wherein a signal representative of an angular position change resulting from said angular motion is produced based on said rate signal;

wherein said drive element is one of a plurality of drive elements, each of said drive elements being operatively coupled to said vibratory resonator at different portions of said vibratory resonator;

wherein said excitation signal is one of a plurality of excitation signals, each of said plurality of excitation signals being applied to a corresponding one of said plurality of drive elements; and wherein said control circuit adjusts a relative amplitudes of said excitation signals to reposition said vibration pattern along said vibratory resonator such that an amplitude of said rate signal is reduced, wherein said relative amplitudes of said excitation signals are adjusted based on said signal representative of said angular position change.

43. A method of electrically interfacing with an inertial sensor that includes a vibratory resonator, the method comprising:
  applying an excitation signal to a drive element operatively coupled with said vibratory resonator to cause said vibratory resonator to vibrate in a vibration pattern, said vibration pattern defining at least one anti-node;
  monitoring said vibration pattern with a first operational element and a second operational element, wherein said first operational element produces a first signal indicative of a vibration characteristic of said vibration pattern present at a corresponding first location on said vibratory resonator, and said second operational element produces a second signal indicative of a vibration characteristic of said vibration pattern present at a corresponding second location on said vibratory resonator that is different from said first location such that, in response to an angular motion of said inertial sensor, said first signal undergoes a change in magnitude at a first rate of change and said second signal undergoes a change in magnitude at a second rate of change that is different than said first rate of change, wherein said first and second signals each include an excitation signal component, said excitation signal components of said first and second signals being of substantially equal magnitude and of opposite phase when said anti-node is aligned with said drive element;
  using a first relationship of respective amplitudes of said first signal and said second signal to measure a rate of said angular motion of said inertial sensor; and
  using a second relationship of respective amplitudes of said first signal and said second signal to measure an amplitude of said excitation signal.

44. The method of claim 43, wherein using said first relationship to measure said rate of angular motion includes combining said first signal with an inverted polarity signal representing said second signal; and
  wherein using said second relationship to measure said amplitude of said excitation signal includes combining said first signal with said second signal.

45. The method of claim 43, further comprising:
  conditioning said first signal and said second signal, including adjusting a ratio of said respective amplitudes of said first signal and said second signal.

46. The method of claim 43, wherein said monitoring of said vibration pattern further includes monitoring said vibration pattern with a third operational element electrically coupled to said first operational element, and monitoring said vibration pattern with a fourth operational element electrically coupled to said second operational element, wherein said first operational element and said third operational element collectively produce said first signal, and wherein said second operational element and said fourth operational element collectively produce said second signal.

47. The method of claim 43, wherein said vibration pattern includes a plurality of nodes situated along said vibratory resonator;
  wherein said using said first relationship of said respective amplitudes of said first signal and said second signal to measure said rate of said angular motion of said inertial sensor produces a rate signal; and
  wherein said method further comprises configuring said first relationship such that, in an absence of rotation of said inertial sensor, said rate signal represents a vibration pattern existing at a node.

48. The method of claim 43, wherein said applying of said excitation signal includes applying a first oscillation drive signal to a first set of at least one drive operational element, and applying a second oscillation drive signal to a second set of at least one drive operational element that is different from said first set.

49. The method of claim 43, further comprising:
  adjusting an amplitude of said excitation signal in response to a change in relative amplitudes of said first signal and said second signal.

50. The method of claim 49, wherein said adjusting is performed such that said relative amplitudes of said first signal and said second signal are generally maintained while said inertial sensor undergoes angular motion.

51. A system for measuring angular motion, comprising:
  a vibratory resonator having a plurality of operational elements that include a plurality of drive elements and a plurality of sensors; and
  a drive circuit that applies excitation signaling to said plurality of drive elements such that said vibratory resonator oscillates according to a vibration pattern that includes a plurality of nodes and anti-nodes, said excitation signaling including a first excitation signal applied to a first set of at least one drive element and a second excitation signal applied to a second set of at least one drive element, wherein relative amplitudes of said first and said second excitation signals control a positioning of said nodes and anti-nodes of said vibration pattern.

52. The system of claim 51, further comprising:
  a vibration monitoring circuit that obtains signaling produced by said plurality of sensors; and
  a control system that adjusts said relative amplitudes of said first and said second excitation signals based on an output of said vibration monitoring circuit such that said vibration pattern is changed to reposition said plurality of nodes and anti-nodes relative to said vibratory resonator.

53. The system of claim 52, wherein a positioning of said nodes and anti-nodes along said vibratory resonator changes in response to angular motion of said vibratory resonator;
  wherein said control system establishes an initial positioning of said nodes and anti-nodes relative to said vibratory resonator in an absence of angular motion; and
  wherein said control system adjusts said relative amplitudes of said first and said second excitation signals in response to a detected angular motion such that said initial positioning of said nodes and anti-nodes is restored.

54. A method for repositioning a vibration pattern of an inertial sensor that includes a vibratory resonator including a centerline axis and a plurality of operational elements situated about said centerline axis, comprising:
  applying a first drive signal to a first set of at least one operational element positioned along a first drive axis that intersects with said centerline axis to define a first orientation;
  applying a second drive signal to a second set of at least one operational element positioned along a second drive axis that intersects with said centerline axis to define a second orientation having a rotational offset about said centerline axis from said first orientation,
  wherein said applying of at least one of said first and second drive signals generates a vibration pattern that includes a plurality of anti-nodes having an angular distribution about said centerline axis, said angular distribution having an angle between adjacent ones of said plurality of anti-nodes, said angle having a magnitude that differs from said rotational offset between said first and second drive axes; and adjusting relative amplitudes of said first and said second drive signals to rotate said anti-node pattern to an arbitrary angular orientation about said centerline axis.

55. The method of claim 54, wherein said applying said first and said second drive signals generates said angle between adjacent nodes at substantially 90 degrees.

56. The method of claim 54, wherein said adjusting of said of said relative amplitudes of said first and said second drive signal includes setting said first drive signal at an amplitude that has a negative polarity, and setting said second drive signal at an amplitude sufficient to sustain vibration of said vibratory resonator.

57. The method of claim 54 wherein said adjusting of said relative amplitudes of said first and said second drive signals substantially retains said angle between adjacent anti-nodes.

58. The method of claim 54, wherein said adjusting of said relative amplitudes of said first and said second drive signals to effect said change in said angular orientation of said anti-node pattern is limited to a range of adjustment less than or equal to 110% of said rotational offset.

59. The method of claim 58, wherein said range of adjustment is limited to 100% of said rotational offset.

60. A system for measuring angular motion, comprising:
a vibratory resonator having a centerline axis;
means for generating a vibration pattern on said vibratory resonator; and
means for controlling said angular orientation of said vibration pattern about said centerline axis.

61. The system of claim 60 further comprising:
means for monitoring said vibration pattern to produce an output that indicates said angular orientation of said vibration pattern, and wherein said means for controlling said angular orientation of said vibration pattern utilizes said output.

62. A circuit that electrically interfaces with an inertial sensor that includes a vibratory resonator, the circuit comprising:
means for causing said vibratory resonator to vibrate in an oscillation pattern;
means for obtaining signals having a drive component and an angular rate component; and
means for isolating said drive component and said angular rate component of said signals.

* * * * *